United States Patent [19]

Hidaka et al.

[11] Patent Number: 5,513,233
[45] Date of Patent: Apr. 30, 1996

[54] NUCLEAR REACTOR

[75] Inventors: Masataka Hidaka; Shinichi Kashiwai; Yoshinori Saito, all of Hitachi; Terufumi Kawasaki, Katsuta, all of Japan

[73] Assignee: Hitachi, Ltd., Tokyo, Japan

[21] Appl. No.: 272,117

[22] Filed: Jul. 7, 1994

[30] Foreign Application Priority Data

Jul. 8, 1993 [JP] Japan .................................. 5-168837

[51] Int. Cl.⁶ ............................ G21C 15/00; G21C 3/322
[52] U.S. Cl. .................................................. 376/352
[58] Field of Search ............................... 376/352, 443

[56] References Cited

U.S. PATENT DOCUMENTS

| | | |
|---|---|---|
| 3,873,419 | 3/1975 | Sletten ............................. 376/352 |
| 4,654,194 | 3/1987 | Christiansen et al. ............ 376/352 |
| 4,826,653 | 5/1989 | Nylund et al. .................... 376/352 |

FOREIGN PATENT DOCUMENTS

| | | | |
|---|---|---|---|
| 51-44791 | 4/1976 | Japan | 376/352 |
| 54-112476 | 9/1979 | Japan | 376/352 |

Primary Examiner—Daniel D. Wasil
Attorney, Agent, or Firm—Antonelli, Terry, Stout & Kraus

[57] ABSTRACT

Improved operability and economy of a nuclear reactor can be obtained by attaining a mixing of the flows of coolant in the lower plenum of the fuel assemblies of the nuclear reactor, a high flow stability of the two-phase flow in the fuel assemblies and a small pressure loss in the core. To achieve this, there is provided a coolant guide tube 60 that communicates with the inside of the fuel support piece 12 inserted in the control rod guide tube and the passage 16, wherein there is formed a coolant guide passage 61 along which coolant descends in the area outside of the coolant guide tube in the fuel assemblies from opening 79. The coolant guide passage along which the coolant descends from the opening is formed in an area outside of the coolant guide tube in the fuel support piece.

14 Claims, 24 Drawing Sheets

NUCLEAR REACTOR

BACKGROUND OF THE INVENTION

This invention relates to a nuclear reactor, and more particularly, to a lower part structure of a core suitable for a boiling water reactor.

Japanese Patent Laid-open application No.2-68195 discloses that, in a nuclear reactor of the type, in which the reinforcing structures, such as beams, for the core support plates are provided to a control rod guide tube at a position near a coolant entrance, a pressure loss at an entrance orifice can be reduced by installing coolant entrances of the control rod guide tubes and fuel support pieces near the lower end of the reinforcing structures of the core support plate.

Atomic Energy Industry, volume 38, No. 11, p. 28 discloses the following.

A coolant guide tube is provided over the lower plenums and the entrances of the fuel assemblies, so that flow stability of the two-phase flow in the fuel assemblies is improved by the inertia of the high-speed coolant which flows inside of the control rod guide tube. In this prior fuel assembly construction, the entrance of the coolant guide tube is formed at a position lower than the lower plenum.

In the conventional technique described in the aforementioned Japanese Patent Laid-open application, it is possible to reduce the pressure loss of the coolant flow between the entrance orifice and the outside of the control rod guide tube. However, the pressure loss between the entrance orifice and the coolant entrance of the fuel assembly cannot be reduced, while maintaining the flow stability of the two-phase flow in the fuel assemblies. For this reason, when a pressure loss in the fuel assemblies becomes larger than the pressure loss between the entrance orifice and the coolant entrance of the fuel assemblies, the flow stability of the two-phase flow in the fuel assemblies decreases.

Because the entrance orifice is located at a position lower than that of the conventional nuclear reactor, the ascending distance of the coolant is shorter than that in the conventional arrangement so that the coolant is not mixed sufficiently. The coolant is discharged from a recirculation internal pump in spaces between the control rod guide tubes.

In the conventional technique described in the Atomic Energy Industry publication, the tube length of the coolant guide tube is made larger, or the tube diameter of the coolant guide tube is made smaller, so as to improve the flow stability of the two-phase flow in the fuel assemblies. If the tube length of the coolant guide tube is made larger, the maximum value of the length is restricted to the height of the lower structure of the core. If the tube diameter of the coolant guide tube is made smaller, it is impossible to sufficiently reduce pressure loss between the entrance orifice of the lower plenum and the coolant entrance of the fuel assemblies.

Therefore, in order to improve the flow stability of the two-phase flow in the fuel assemblies and to sufficiently reduce the pressure loss between the lower plenums and the coolant entrance of the fuel asaemblies, the length of the coolant guide tube is made larger. Because the entrance of the coolant guide tube is located at the lower part of the lower plenum, the flow of coolant discharged from the recirculation internal pump does not mix sufficiently.

SUMMARY OF THE INVENTION

An object of this invention is to provide a nuclear reactor with improved operability and economy by improving the flow stability of the two-phase flow in the fuel assemblies and by reducing sufficiently the pressure loss between the lower plenums and the coolant entrances of the fuel assemblies.

In a first aspect of the present invention, a nuclear reactor of a type where coolant is supplied to fuel assemblies in the pressure vessel from lower plenums located at a lower part than the fuel assemblies, has a first passage connected to the coolant entrance of the lower part of the plenums for effecting downward flow of the coolant and a second passage for effecting upward flow of the coolant from the first passage, thereby to supply the coolant to the fuel assemblies.

A second aspect of the present invention resides in that the nuclear reactor has a first passage connected to the coolant entrance of the lower part of the plenums for effecting upward flow of the coolant, a second passage for effecting downward flow of the coolant from the first passage, and a third passage for effecting upward flow of the coolant from the second passage, thereby to supply coolant to the fuel assemblies.

A third aspect of the present invention is that there is further provided a coolant passage of a spiral-form, which communicates the coolant entrances of the lower part of the plenums with the fuel assemblies.

According to the first aspect mentioned above, the coolant is mixed in the lower plenum, then it flows downwardly through the first passage and flows upwardly through the second passage, and thereafter the coolant is supplied to the fuel assemblies. According to the second aspect mentioned above, the coolant is mixed in the lower plenum, then the coolant flows upwardly through the first passage, flows downwardly through the second passage and further flows upwardly through the third passage, and then the coolant is supplied to the fuel assemblies. According to the third aspect mentioned above, the coolant is mixed in the lower plenum, then the coolant flows through the inside of a coolant passage having a spiral-form, and the coolant is supplied to the fuel assemblies.

As stated above, by using combinations of the passages in such a manner that the coolant flows downwardly - upwardly, downwardly - upwardly - downwardly, or is caused to flow through spiral pipes, the coolant passages can be sufficiently lengthened, and the flow stability of the two-phase flow in the fuel assemblies can be greatly improved by the flow inertia of the coolant.

If the flow stability of the two-phase flow in the fuel assemblies is substantially the same as that of the conventional reactor, the tube diameter of the coolant passages can be made larger, and the pressure loss between the entrance orifice and the entrance of the fuel assemblies can be reduced sufficiently.

Therefore, the distribution of the flow rate of coolant to the respective fuel assemblies is optimized to improve the flow stability of the two-phase flow in the fuel assemblies. As a result, the pressure loss between the lower plenum and the entrance of the fuel assembly can be reduced, so that the operability and the economy of the nuclear reactor can be improved.

BRIEF DESCRIPTION OF THE DRAWINGS

FIGS. 6, 8, 10, 12, 14, 16, 18, 19, 21 and 23 are sectional views along the A—A line of FIGS. 5, 7, 9, 11, 13, 15, 17, 20 and 22.

DETAILED DESCRIPTION OF THE PREFERRED EMBODIMENTS

The present invention will be described by way of various examples in detail based on the drawings.

Figure 1:
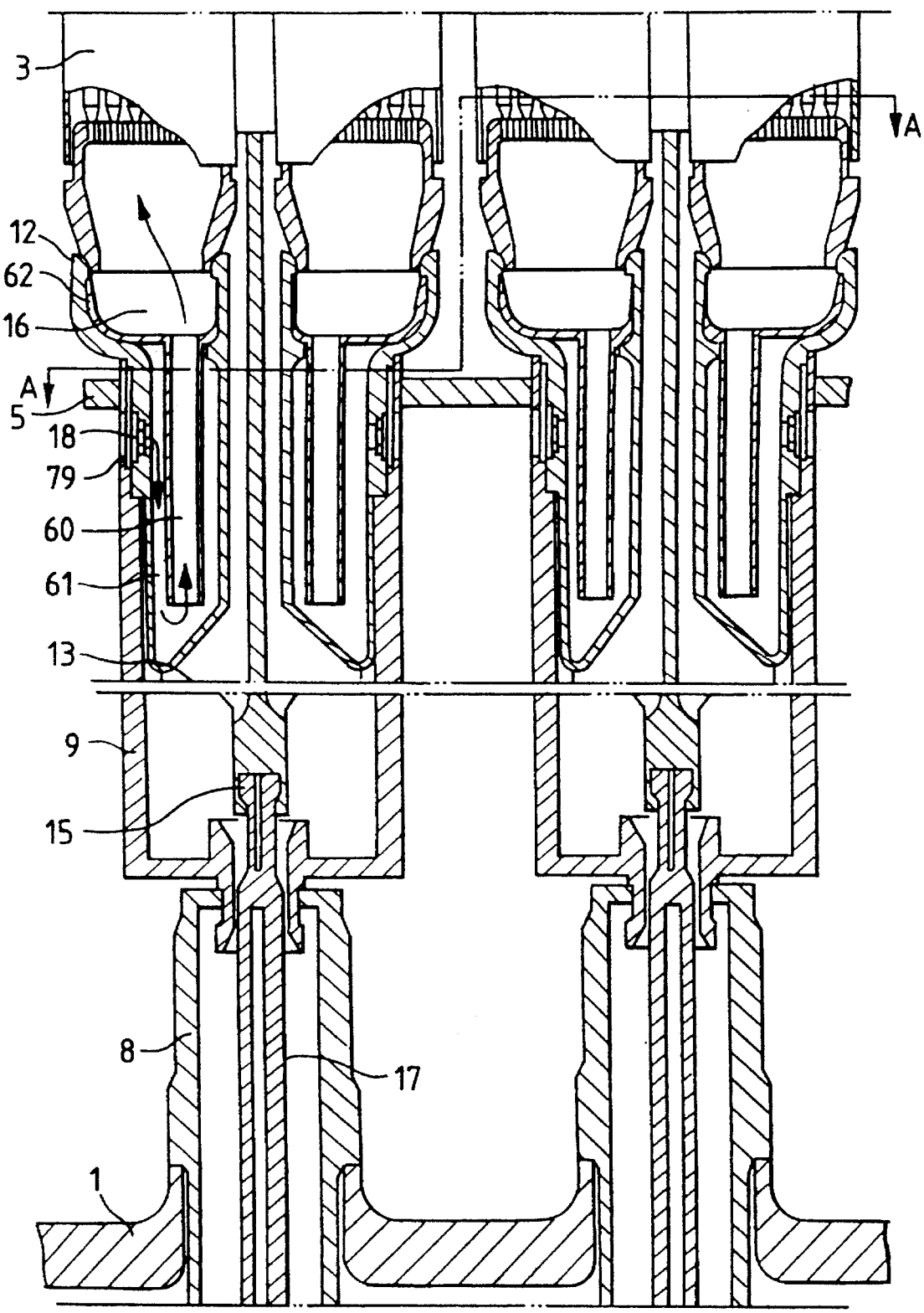
FIG. 1 is a sectional view of a lower part of the structure of a core representing a first example of the present.
Figure 2:
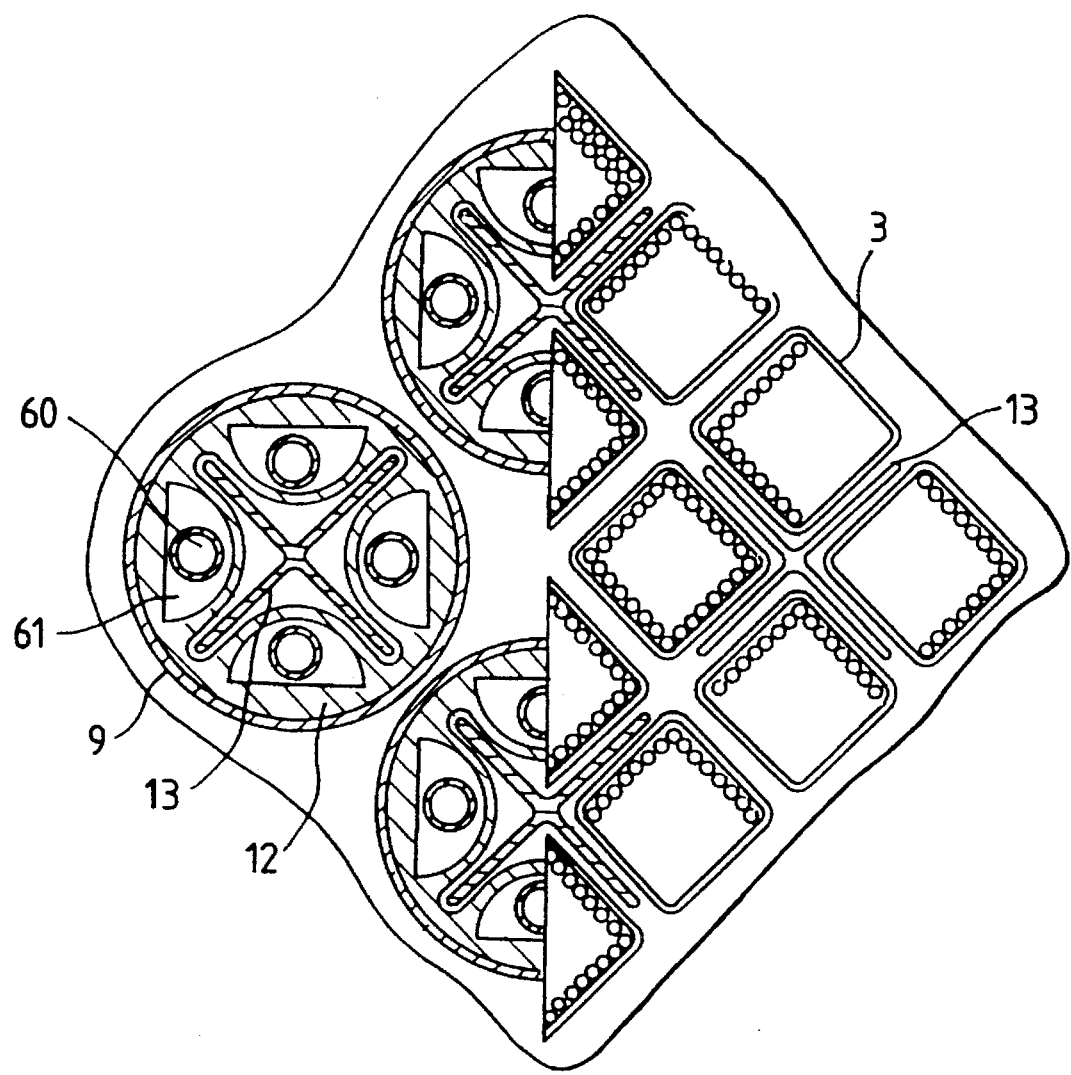
FIG. 2 is a sectional view taken along the A—A line of FIG. 1.
Figure 3:
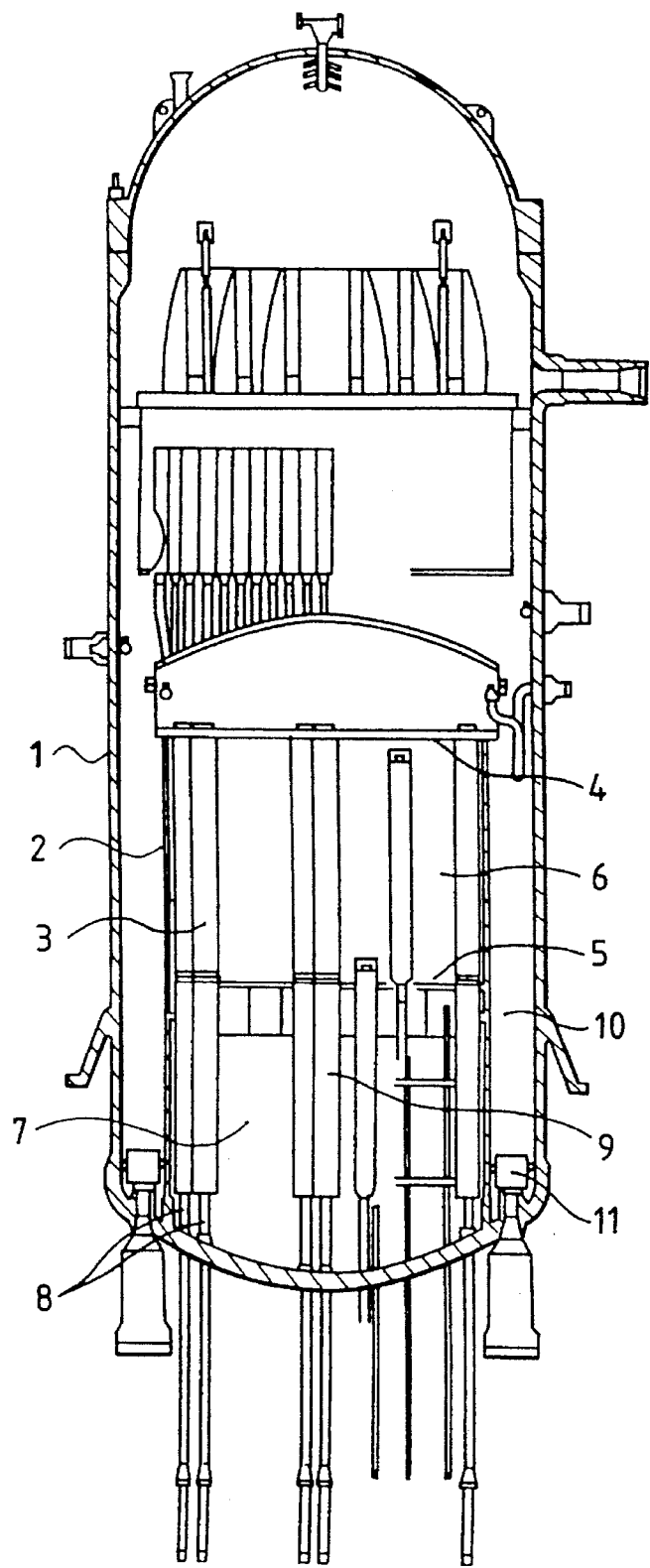
FIG. 3 is a vertical sectional view of a reactor core to which the present invention is applied.

The first example of this invention is explained with reference to FIG. 1–FIG. 3. FIG. 1 shows a vertical sectional view of a lower part of the structure of the core. FIG. 2 shows a sectional view along the A—A line of FIG. 1. FIG. 3 shows a vertical sectional view of a boiling water reactor to which this invention is applied.

There is provided a core 6 surrounded by a shroud 2 and having a plurality of fuel assemblies 3 mounted in a pressure vessel 1 of the boiling water reactor. Core 6 is held between top fuel guide 4 and a core plate assembly 5. The area under core plate assembly 5 is called a lower plenum 7. In lower plenum 7, there is installed a housing 8 for the control rod drive mechanism that penetrates the bottom plate of the pressure vessel 1 and a control rod guide tube 9 that is fixed to housing 8.

Control rod guide tube 9 is connected to housing 8 of the control rod drive mechanism fixed on the bottom portion of pressure vessel 1. Control rod 13 is accommodated in control rod guide tube 9. The lower end of control rod 13 is detachably connected to the top end of control rod driving rod 17 via a coupling 15. Control rod driving rod 17 of this control rod mechanism is provided inside of housing 8 of the control rod driving mechanism, thereby to move up and down freely.

Core plate assembly 5 into which the upper part of the control rod guide tube 9 is inserted is a partition placed between the core 6 in which fuel assemblies 3 are installed and the lower plenum 7 below the core. Four fuel assemblies 3 are mounted through fuel support pieces 12 for control rod guide tube 9.

Passage 16 is formed in fuel support piece 12 for each of the fuel assemblies 3. An opening formed in fuel support piece 12 is located on the upper part of the control rod guide tube 9, so that coolant from the outside of control rod guide tube 9 is able to flow into fuel support piece 12. If desired, an entrance orifice 18 for adjusting the flow rate of the coolant flowing into the fuel assemblies 3 can be installed in that opening.

In passage 16 there is of fuel support piece 12 provided a structure comprising support piece 62 for separating the flow passage 16 and the fuel support piece 12 and for communicating with the lower part of the fuel support piece 12 connected to the support plate and passage 16.

The outside area of coolant guide tube 60 forms an area where the coolant flows down from the opening 79 in the fuel support piece 12. Coolant guide passage 61 and passage 16 are separated in the joining surface of support plate 62 and fuel support piece 12 to prevent mutual cooling water from circulating.

From the view point of preventing the occurrence of a pressure loss due to reduction and expansion of the flow area of the coolant, it is useful that the flow area of the coolant guide tube 60 and the flow area of the coolant guide passage 61 are set to be approximately equal to each other.

Figure 4:
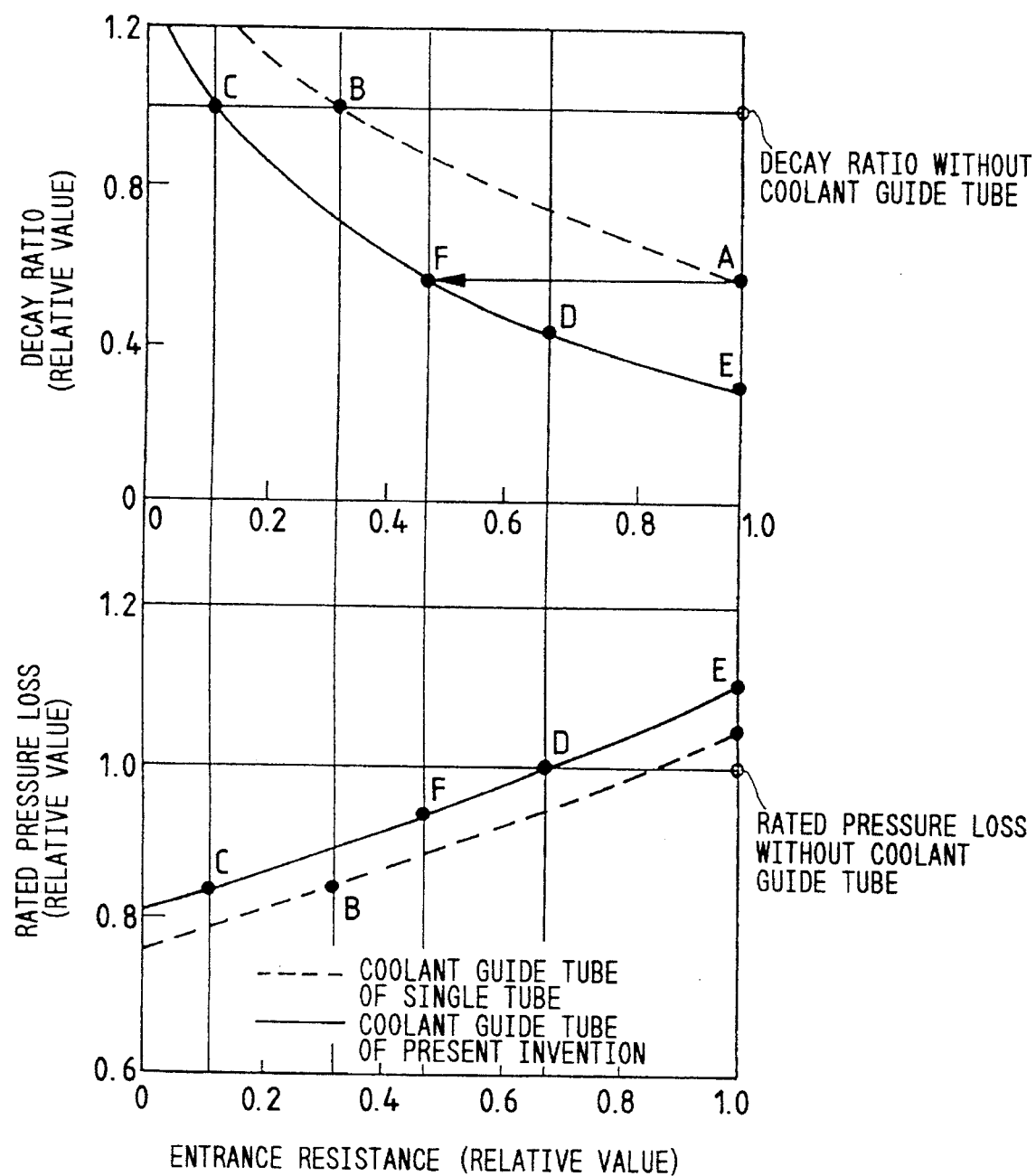
FIG. 4 is a characteristic diagram for a coolant guide tube of the reactor of the present invention.

In the following, the function and the effect of this example are explained with reference to FIG. 4. FIG. 4 is a characteristic diagram which compares a coolant guide tube (broken line in the graph) having a single pipe with a coolant guide tube (solid line in the graph) of the present invention with respect to the decay ratio and pressure loss that are indexes of a flow stability in the fuel assembly. The ○ mark in the figure represents the value in case of not using the coolant guide tube.

The abscissa shows the relative value of the entrance resistance provided by entrance orifice 18. The ordinate shows the relative value of the decay ratio and pressure loss at the rated operation. Here, the decay ratio is the value that represents damping of the flow amplitude, and the smaller the value, the higher the flow stability is.

The coolant discharged in lower plenum 7 by recirculation internal pump 11 rises in the outside of control rod guide tube 9, and flows into fuel support piece 12 from opening 79 provided near the upper end of the side wall of the control rod guide tube 9, then it descends in coolant guide passage 61 and flows into coolant guide tube 60 via the lower bent part of fuel support piece 12. In addition, the coolant rises in the inside of coolant guide tube 60, and flows into fuel assembly 3 from passage 16 at the upper part of fuel support piece 12.

Because the opening 79 of the control rod guide tube 9 is located at the same position as a conventional entrance orifice 18, the coolant is mixed sufficiently while rising in the spaces between control rod guide tubes 9, and the flow distribution to each fuel assembly is optimized by eliminating any fluctuation of the pressure, etc. The coolant that flows into opening 79 of control rod guide tube 9 rises in the inside of coolant guide tube 60, and it ascends in coolant guide tube 60, after descending in coolant guide passage 61, so that the passage length becomes longer. Therefore, the passage length of coolant in fuel support piece 12 can be extended to the extent of about double the length of the coolant guide tube of the single pipe type, by extending the lower end of control rod guide tube 9 of the lower end of fuel support piece 12.

Compared with the case in which the coolant guide tube is not used, the coolant guide tube of the single pipe type shown by the broken line in FIG. 4 exhibits better stability of fuel assemblies because of a decrease in the decay ratio by the inertial effect, as is shown by point A. The rated pressure loss can be decreased, as shown by point B, provided that the flow stability is the same as the case in which the coolant guide tube is not used.

On the other hand, the solid line of FIG. 4 shows the characteristics of the case where the passage length for the coolant is set to be about double the length of the coolant guide tube of the single pipe type. If the relative value of the entrance resistance is 1.0, the stability of the fuel assemblies 3 is improved, as is shown by point E. The decay ratio of this example is further decreased, compared with the case of the coolant guide tube of the single pipe type. As shown by point F, the rated pressure loss greatly decreases in comparison with the point A, when the decay ratio is the same at point A of the coolant guide tube of the single pipe type.

As stated above, by virtue of the effect of the inertia of the coolant flowing into the fuel assemblies 3, the flow stability of the two-phase flow of the fuel assembly can be greatly improved, and the pressure loss between the entrance orifice and the entrance of the fuel assemblies can be reduced. Moreover, as the flow of coolant can be mixed sufficiently in the lower plenum, the operability and the economy of a nuclear reactor can be improved.

Figure 5:
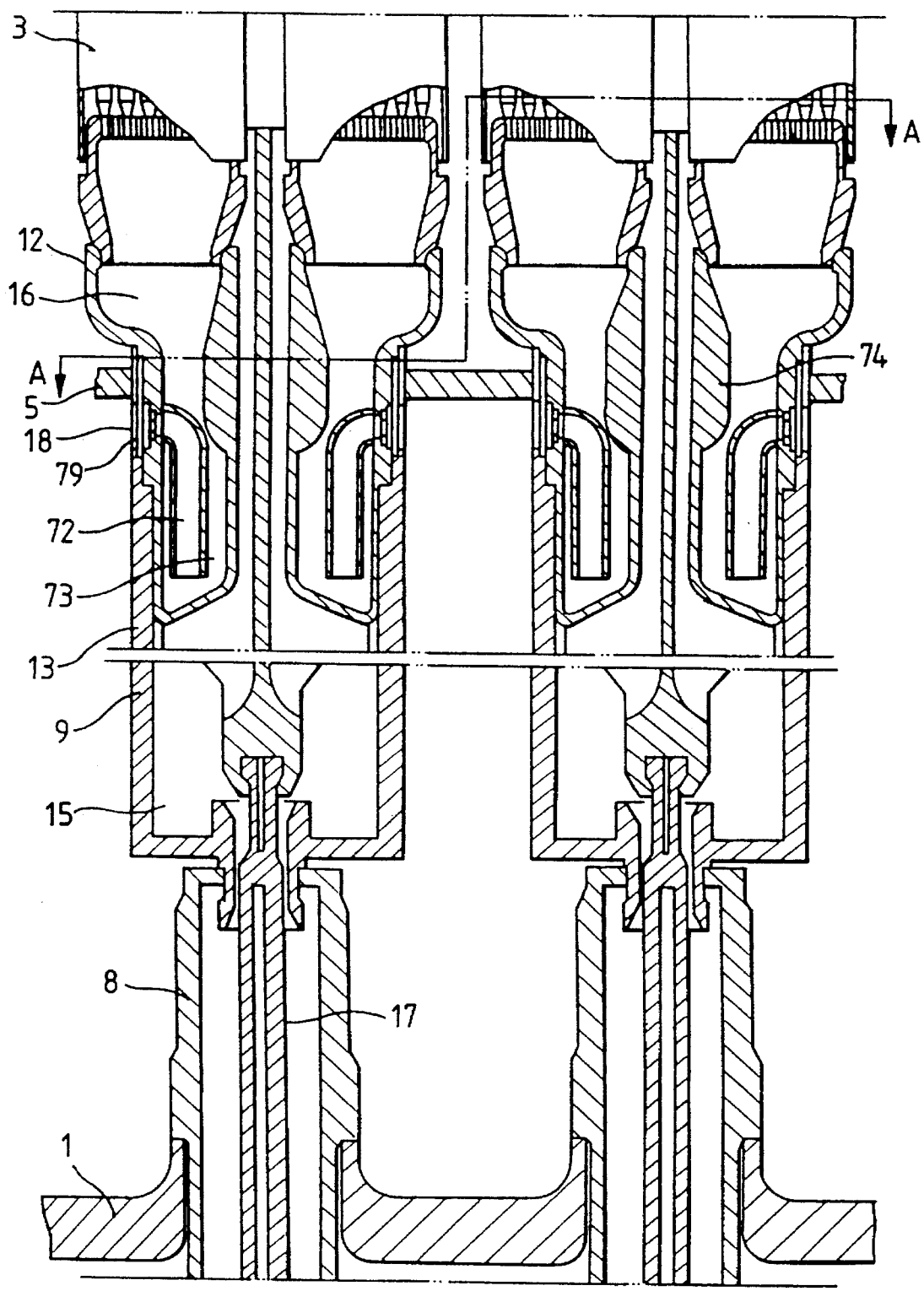
FIGS. 5, 7, 9, 10, 11, 13, 15, 17, 20 and 22 are sectional views of a lower part of structures of a core forming examples of the present invention.
Figure 6:
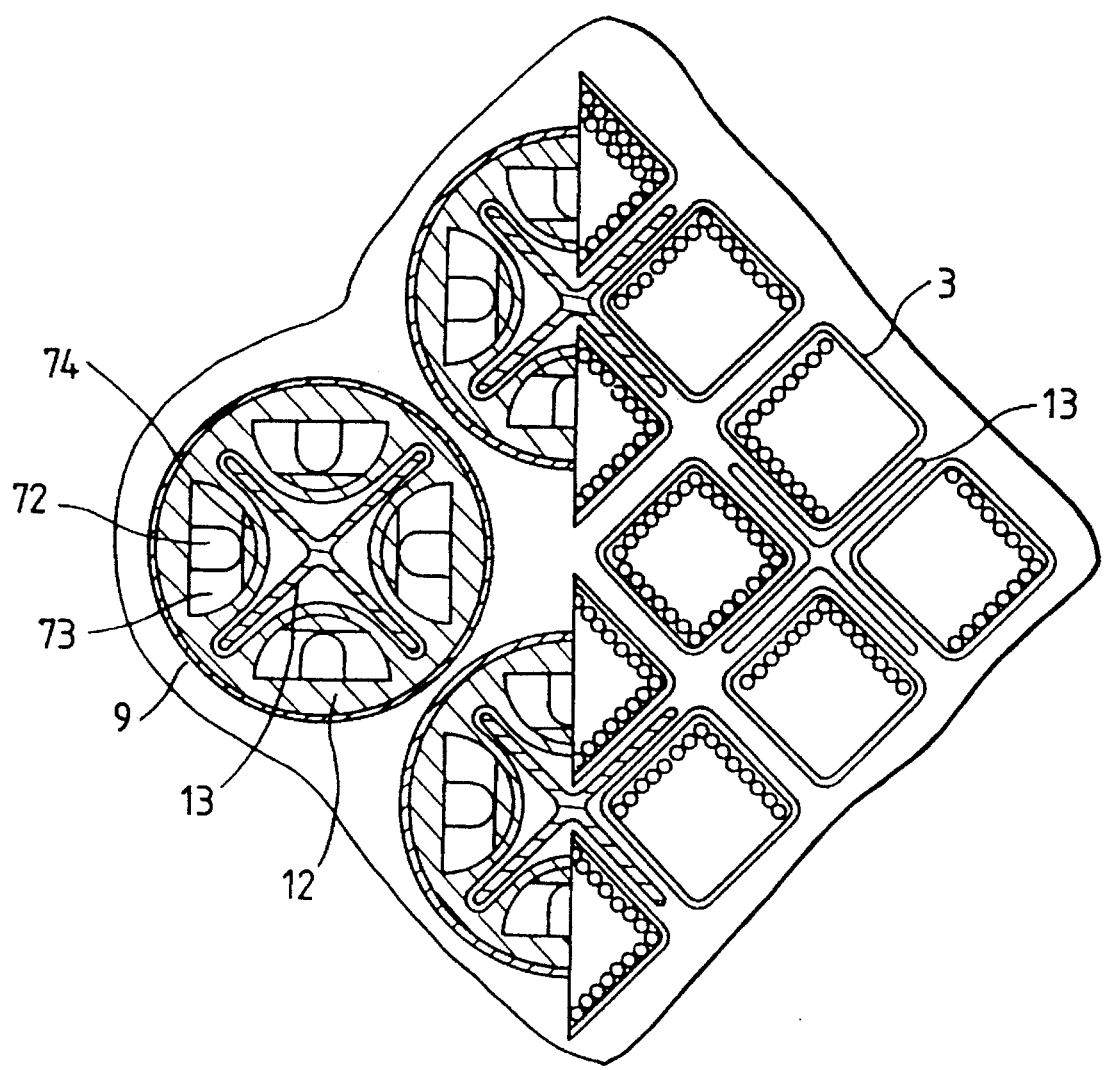

A second example of this invention is explained using FIG. 5 and FIG. 6. FIG. 5 shows a vertical sectional view of the lower part of the structure of the core in accordance with this invention. FIG. 6 shows a sectional view along the A—A line of FIG. 5.

Coolant guide tube 72 that communicates opening 79 with the inner lower part of fuel support piece 12 is provided on the fuel support piece 12. The area outside of coolant guide tube 72 and inside of fuel support piece 12 forms the coolant guide tube passage 73.

From the view point of preventing the occurrence of the pressure loss due to the reduction and expansion of the flow area of the coolant, it is effective that the flow area of the coolant guide tube 72 and the flow area of coolant guide passage 73 are approximately equal to each other.

In this example, structure 74 for adjusting the flow area is provided, thereby to make the flow area of coolant guide passage 73 in fuel support piece 12 at an upper part above the opening 79 substantially the same as the flow area of the coolant guide passage 73 at a lower part below the opening 79.

The function of this feature is explained in the following. The coolant discharged into lower plenum 7 from recirculation internal pump 11 rises around the outside of control rod guide tube 9. The coolant enters coolant guide tube 72 of fuel support piece 12 from opening 79 formed in the side wall near the top end of control rod guide tube 9, and then it descends. The coolant that descends in coolant guide tube 72 flows into fuel assemblies 3 from passage 16 of the upper part of the fuel support piece 12. It then ascends in coolant guide passage 73 via the lower bent part of fuel support piece 12.

Because the opening 79 of the control rod guide tube 9 is located at the same position as that of the conventional entrance orifice 18, the coolant is mixed sufficiently, while rising in control rod guide tube 9. As a result, any fluctuation of the pressure disappears and the flow distribution to each fuel assembly is optimized. The coolant that flows into coolant guide passage 72 descends and rises so that passage length becomes longer.

Therefore, the passage length of the coolant in the fuel support piece 12 can be extended to the extent of about double the length of the coolant guide tube of the single pipe type, by extending the lower end of fuel support piece 12 to the lower end of control rod guide tube 9.

According to this example, the operability and the economy of the nuclear reactor can be improved, because the effect of the inertia of the coolant that flows into fuel assemblies 3 is promoted through the function and effect similar to those described in the first example.

Figure 7:
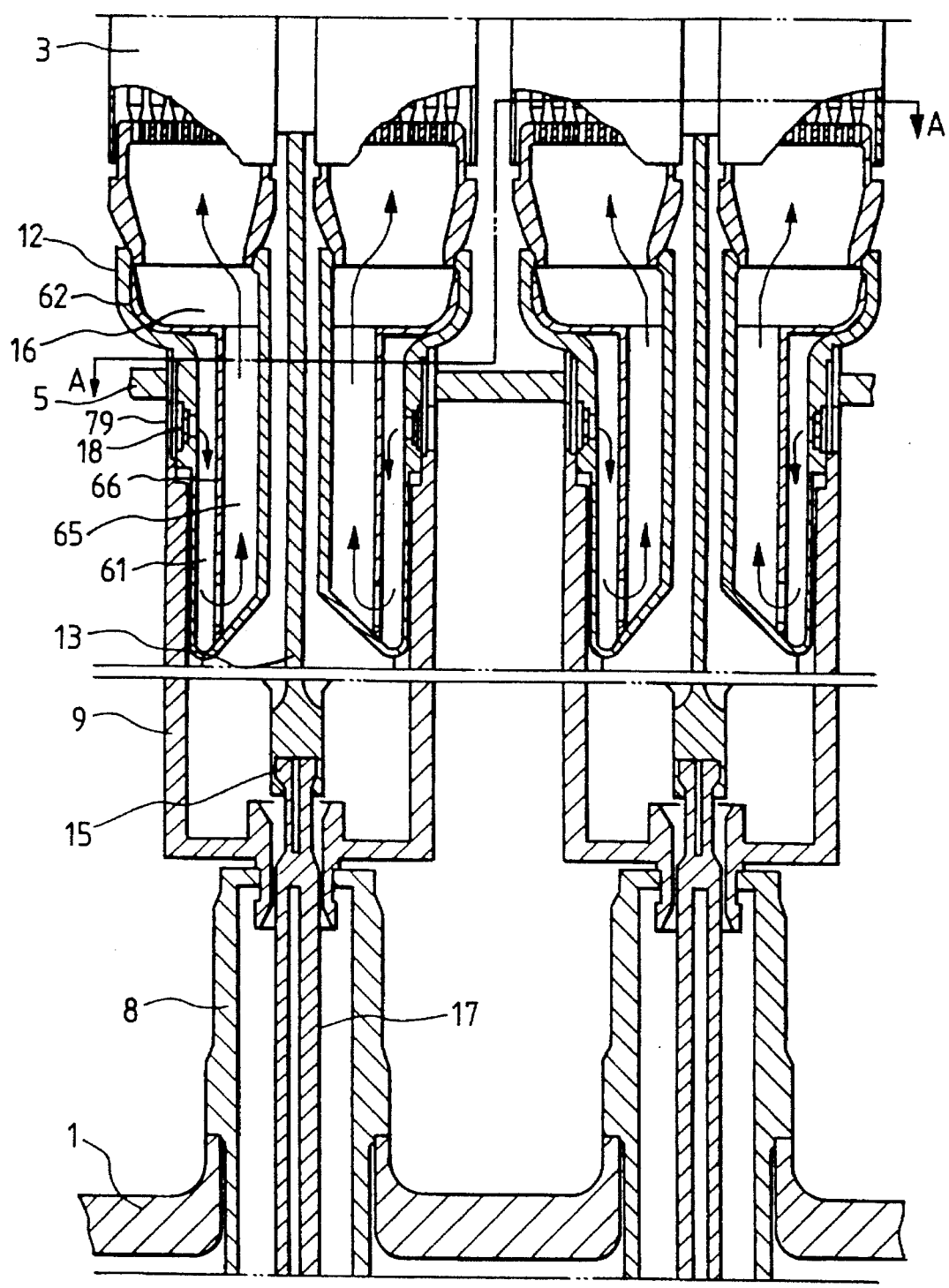
Figure 8:
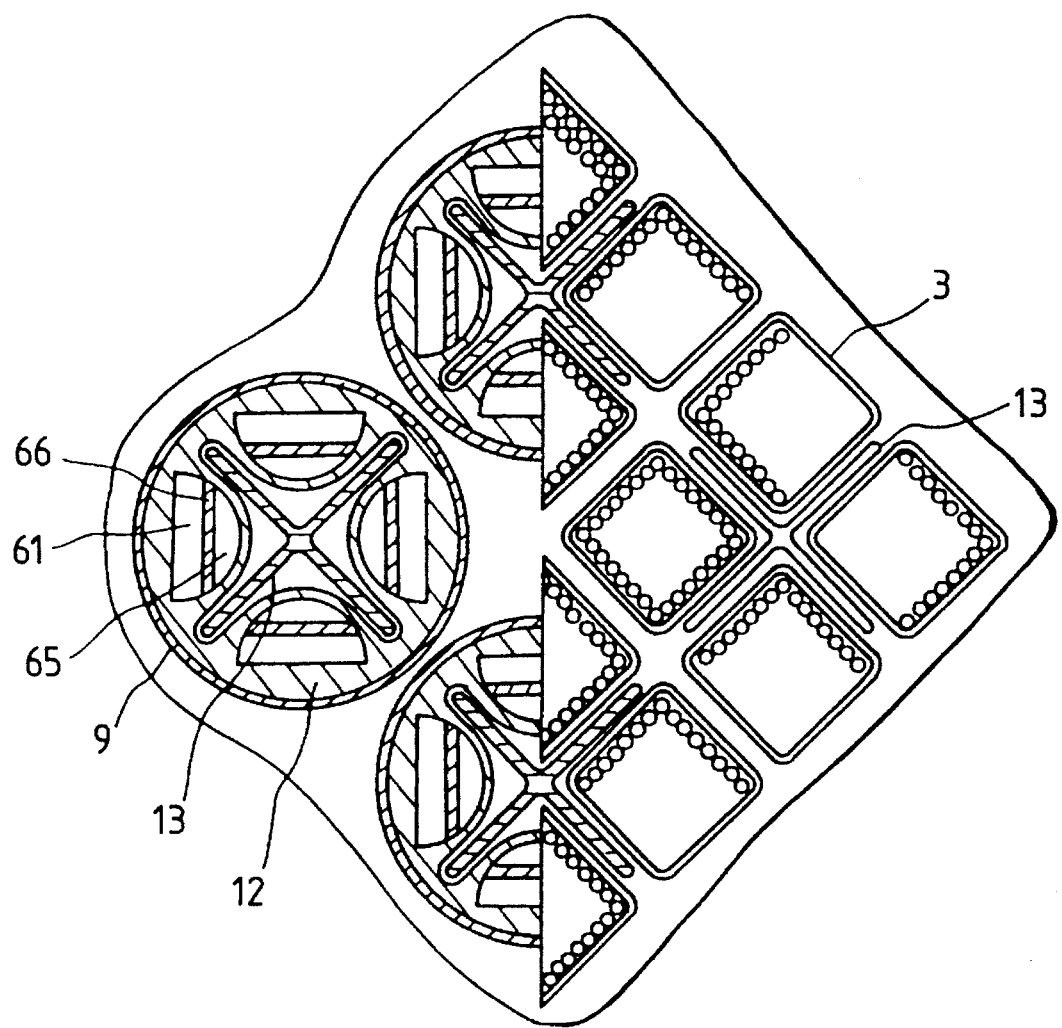

The third example of this invention is explained using FIG. 7 and FIG. 8. FIG. 7 shows a vertical sectional view of the lower part structure of the core. FIG. 8 shows a sectional view along the A—A line of FIG. 7.

Baffle plate 66 is provided in fuel support piece 12. Buffle plate 66 has an opening at the lower part of the fuel support piece 12, and is connected to the bottom portion of the fuel support piece 12 and to support plate 62 that separates passage 16 and the vicinity of the opening 79. An inside space of the fuel support piece 12 is divided into coolant guide passage 61 forming a descending passage for coolant and coolant guide tube 65 forming a descending passage by baffle plate 66. From the view point of preventing a occurrence of the pressure loss due to reduction and expansion of the flow area of the coolant, it is effective that the flow area of the coolant guide tube 61 is set to be approximately equal to the flow area of the coolant guide tube 65.

The function of this example is explained in the following. The coolant discharged into the lower plenum 7 from the recirculation internal pump 11 rises the outside of control rod guide tube 9, then enters and descends in coolant guide tube 61 in fuel support piece 12 from the opening 79 formed in the side wall near the upper end of the control rod guide tube 9. The coolant that flows into coolant guide passage 65 from the lower opening of baffle plate 66 flows into fuel assemblies 3 from the passage 16 of the upper part of the fuel support piece 12.

Because opening 79 in the control rod guide tube 9 is located at the same position as the conventional entrance orifice 18 and the coolant rises in control rod guide tube 9, the coolant is mixed sufficiently and the fluctuation of the pressure disappears. As a result, it is possible to optimize the flow distribution to each fuel assembly.

The coolant flowing into opening 79 of control rod guide tube 9 ascends in coolant guide passage 65, after descending in coolant guide tube 61, so that the passage length becomes longer. Therefore, the length of the passage of coolant in fuel support piece 12 can be extended to the extent of about double the length of a coolant guide tube having a single pipe.

According to this example, the operability and the economy of the nuclear reactor can be improved through a function and effect similar to those of the first example.

Figure 9:
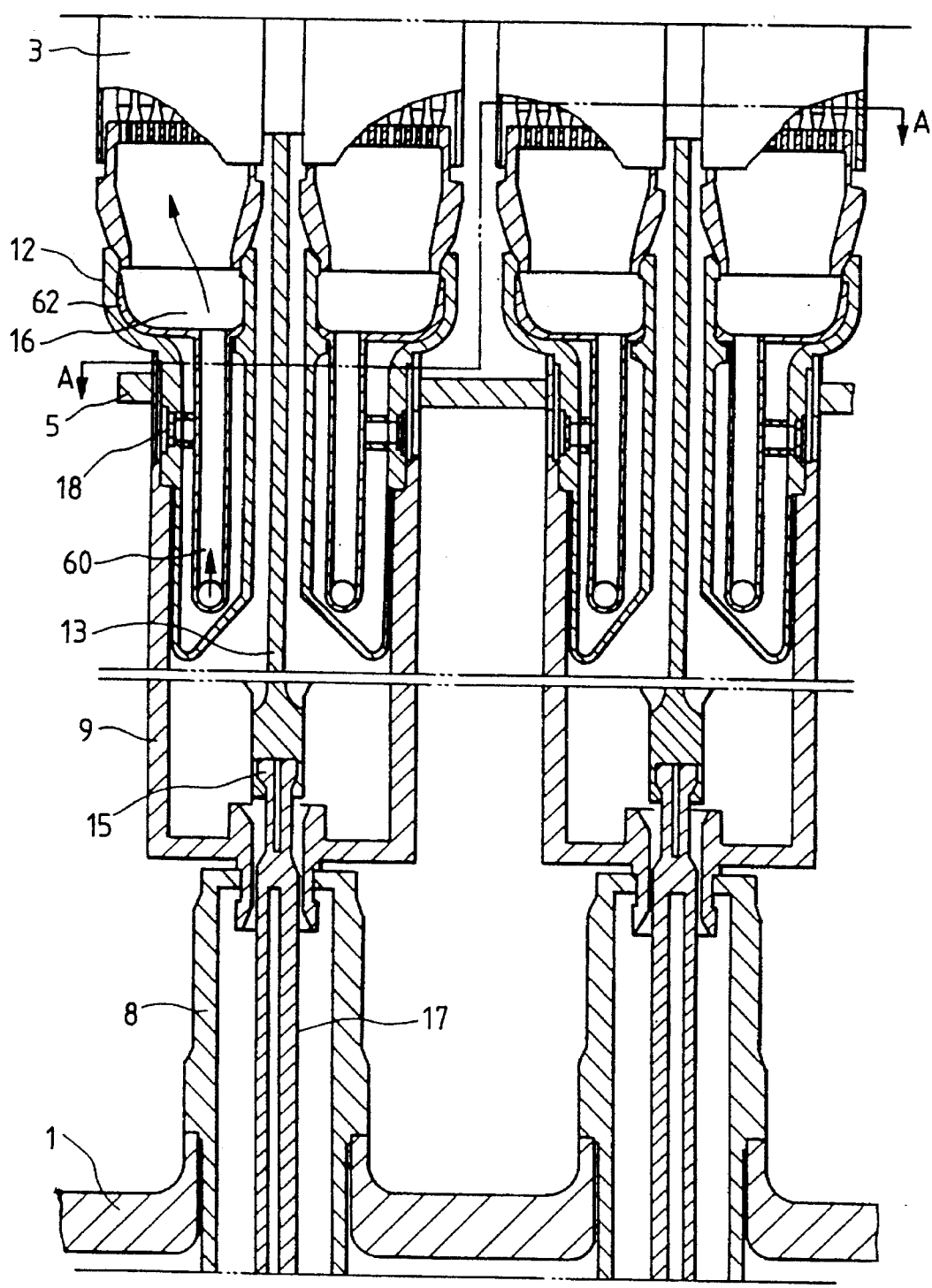
Figure 10:
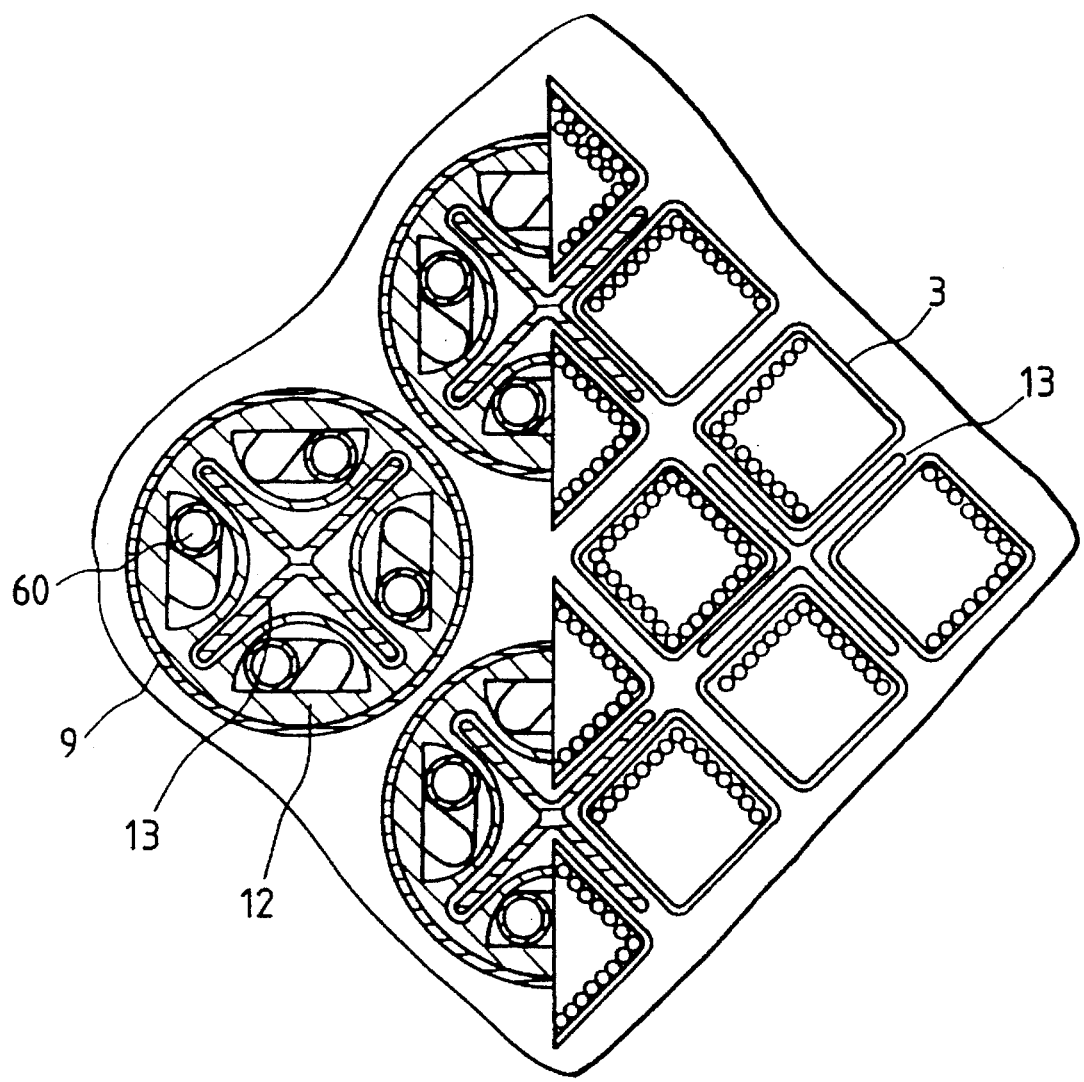

The fourth example of this invention is explained using FIG. 9 and FIG. 10. FIG. 9 shows a vertical sectional view of the lower part of the structure of the core. FIG. 10 shows a sectional view along the A—A line of FIG. 9.

The structure of the coolant guide tubes 60 is disposed together with support plate 62 for partitioning flow passage 16 and the inside of fuel support piece 12 in passage 16 of fuel support piece 12. The structure is connected to the support plate 62 and extends downwardly inside of the fuel support piece 12 to opening 79.

The function of this feature is explained in the following. The coolant discharged from recirculation internal pump 11 into the lower plenum 7 rises along the outside of the control rod guide tube 9. The coolant flows into coolant then guide tube 60 of the fuel support piece 12 from opening 79 formed in the side wall near the upper end of control rod guide tube 9 and thereafter it descends. After descending to the lower part of fuel support piece 12, the coolant rises inside of coolant guide tube 60 and flows into fuel assemblies 3 from passage 16 of the upper part of the fuel support piece 12.

The flow distribution to each fuel assembly is optimized, since the opening 79 in the control rod guide tube 9 is located at the same position as conventional entrance orifice 18. Since the coolant rising in the control rod guide tube 9 is mixed sufficiently, any fluctuation of pressure disappears.

The coolant flowing into opening 79 of control rod guide tube 9 rises inside of coolant guide tube 60, after descending along the outside of coolant guide tube 60, so that the passage length becomes longer. Therefore, the length of the coolant passage in the fuel support piece 12 can be extended as mentioned before.

Figure 11:
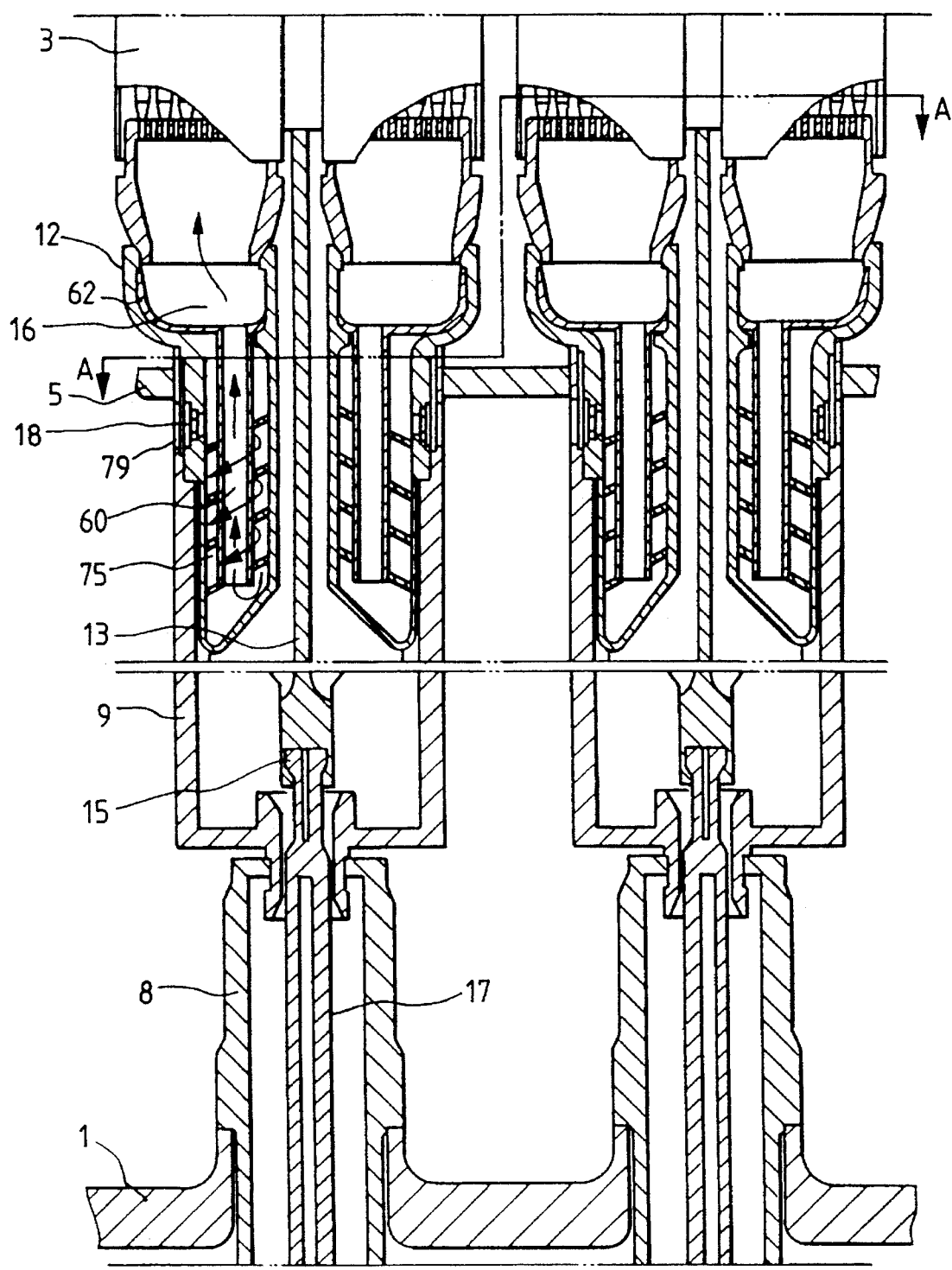
Figure 12:
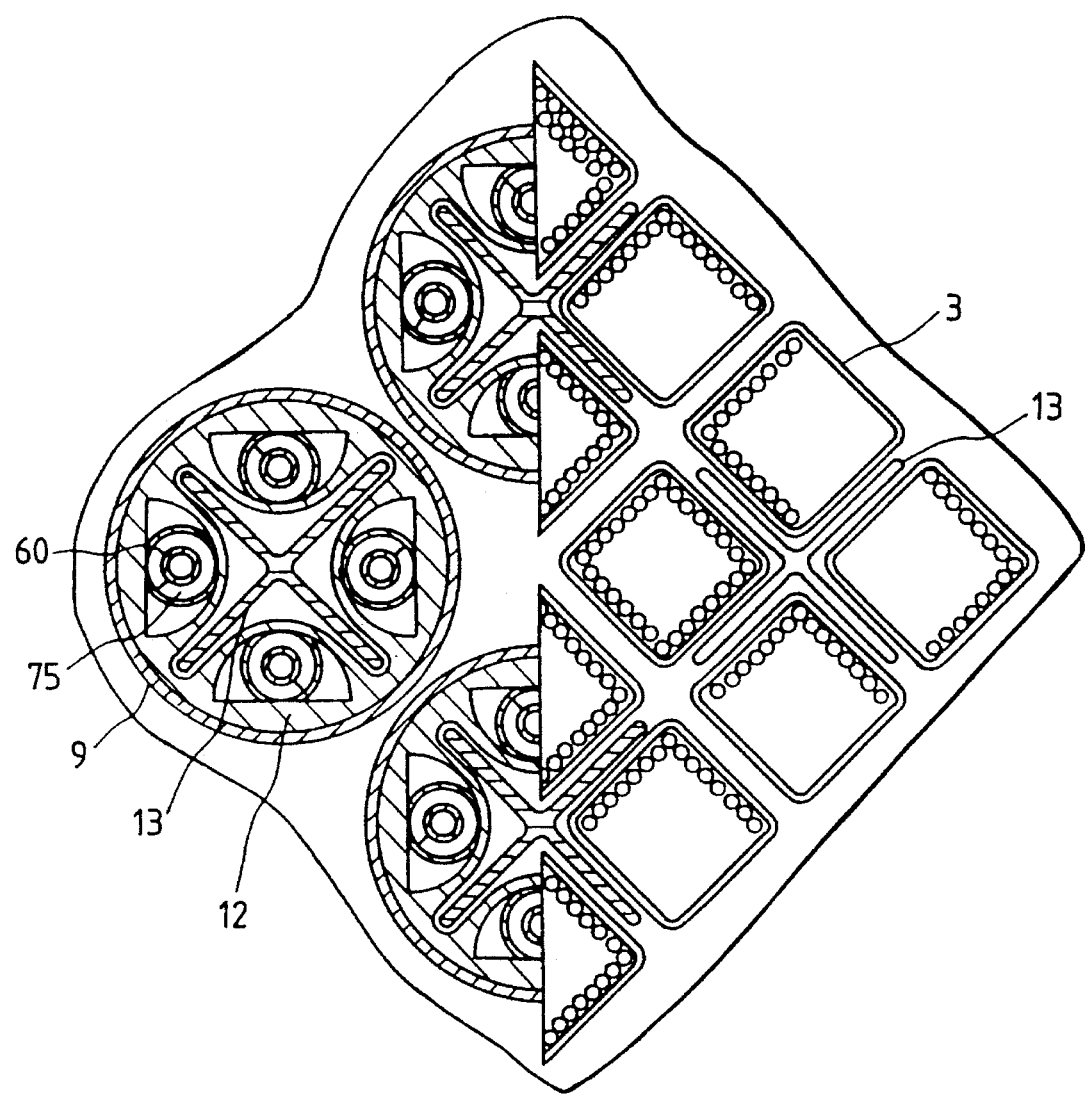

The fifth example of this invention is explained using FIG. 11 and FIG. 12. FIG. 11 shows a vertical sectional view of the lower part of the structure of the core. FIG. 12 shows a sectional view along the A—A line of FIG. 11. Coolant guide tube 75 of spiral-form formed by a partition plate having a spiral structure is disposed in the area outside coolant guide tube 60 and inside of the fuel support piece 12. Coolant guide passage 75 can be composed of a pipe communicating with coolant guide tube 60.

The function and effect of this example are substantially the same as those described in other examples, except that a spiral-form partition plate is used in this example.

Figure 13:
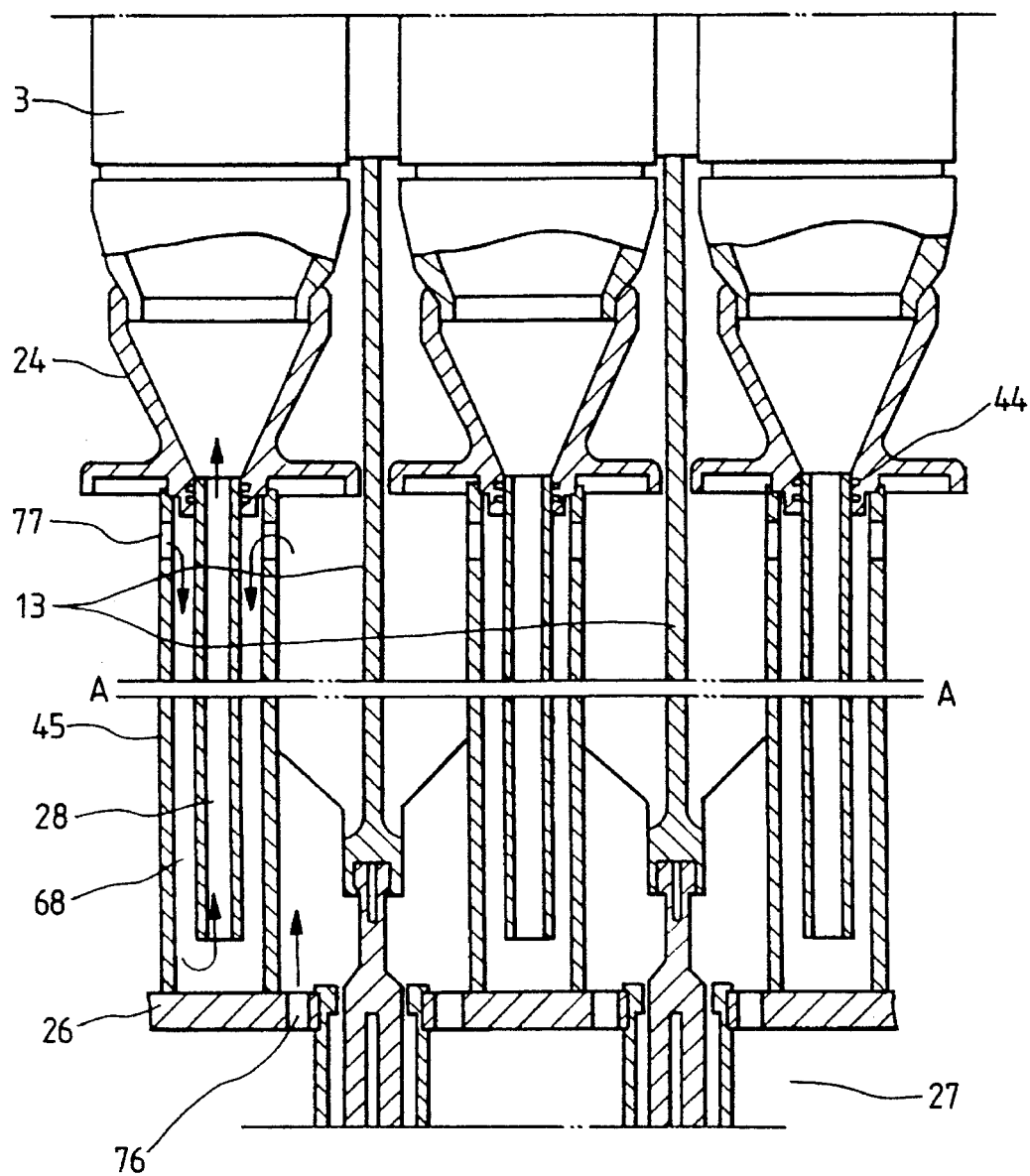
Figure 14:
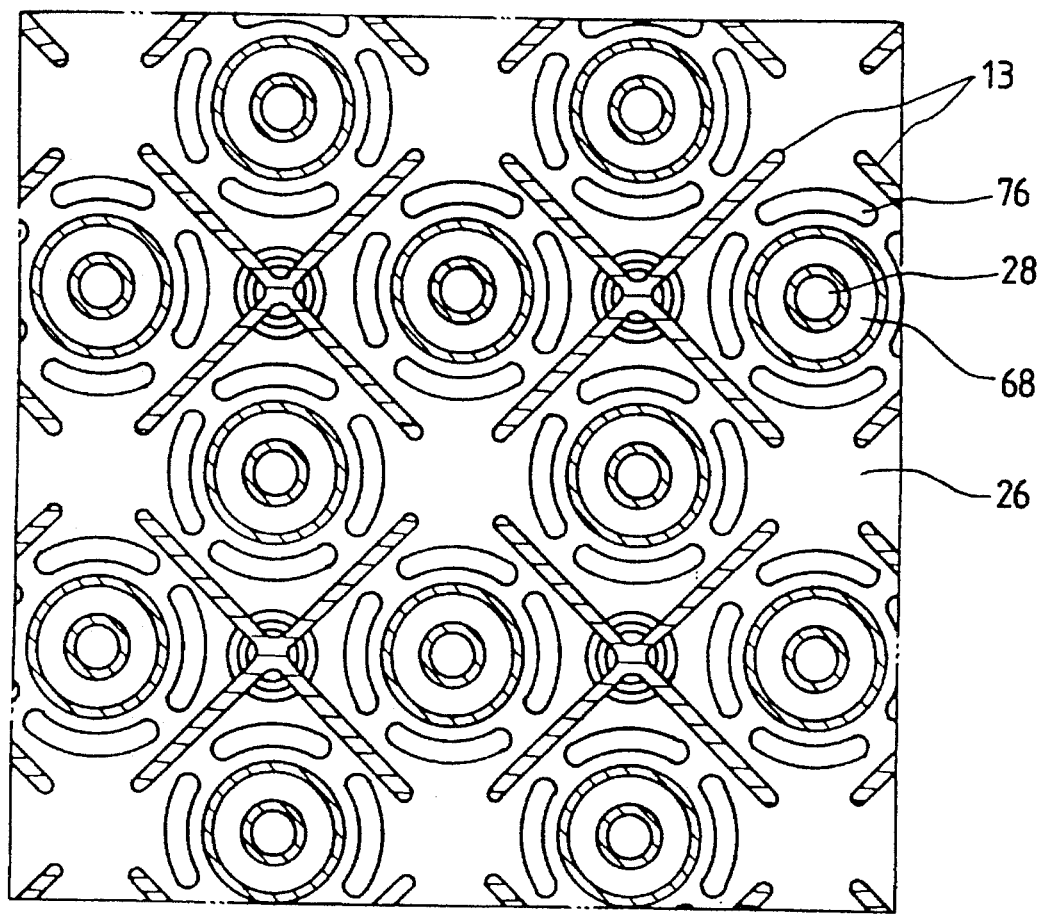

The sixth example of this invention is explained with reference to FIG. 13 and FIG. 14. FIG. 13 is a vertical sectional view of the lower structure of the core according to this invention. FIG. 14 is a sectional view along the A—A line in FIG. 13.

The housing 8 of the control rod driving mechanism is fixed to the bottom portion of the pressure vessel 1. The lower plenum in pressure vessel 1 is partitioned into upper and lower portions by partition plate 26 whose outer periphery touches the shroud 2 shown in FIG. 3, and the partition plate is inserted into the head of the housing 8 of the control rod driving mechanism. A bottom portion passage 27 of the vessel is formed for receiving coolant sent to the lower position of partition plate 26 by a recirculation internal pump.

The coolant guide tube 28 is inserted into the coolant entrance of the fuel support piece 24, and the coolant entrance of the fuel assemblies 3 is inserted into the upper end of the fuel support piece 24. Support tube 45 has coolant guide tube 28 as a support component outside the coolant guide tube 28. The upper end of support tube 45 supports fuel support metal fitting 24, and partition plate 26 supports support tube 45. The annular area that is formed between support tube 45 and the coolant guide tube 28 forms the coolant guide tube 68, which extends to the lower end of coolant guide tube 28.

The bottom portion passage 27 of the pressure vessel and the outside area of the support tube 45 are communicated through opening 76, and the outside area of support tube 45 and coolant guide tube 68 are communicated by opening region 77 of the upper part of the support tube 45. The coolant coming from the bottom portion passage 27 of the vessel flows into the fuel assemblies 3 through the series of passages mentioned above. The flow rate of the coolant to the fuel assembly 3 is adjusted by providing a component, such as an entrance orifice, etc. for producing a pressure loss in a part of the passages. It is effective that the flow area of the coolant guide tube 28 is approximately equal to the flow area of the coolant guide tube 68 flow the point of view of avoiding a pressure loss due to reduction and enlargement of the flow area of the coolant.

The following is an explanation of the action of this example. The coolant discharged into lower plenum 7 from recirculation internal pump 11 flows upwardly along the outside of the support tube 45 via communication opening 76 from bottom portion passage 27 of the vessel and enters coolant guide tube 68 from the opening region 77 of the upper part of the support tube 45. The coolant that flows downwardly through coolant guide tube 68 enters coolant guide tube 28 from the lower part in support tube 45, and rises, then flows into the fuel assemblies 3 via the fuel support piece 24. Because opening region 77 in support tube 45 is located at a position that is the same as the conventional entrance orifice, the coolant is mixed sufficiently, while rising in the spaces between support tubes 45, with the result that any fluctuation of pressure disappears, and the flow distribution to the fuel assemblies is optimized.

Because the coolant supplied from opening region 77 of the support tube 45 rises inside of the coolant guide tube 28 after descending in coolant guide tube 68, the passage length becomes longer. Therefore, the maximum length of the coolant passage can be made approximately double that of the coolant guide tube of the single pipe type by extending the lower end of the coolant guide tube 28 in the vicinity of partition plate 26.

According to this example, the operability and the economy of the nuclear reactor can be improved and an effect that is similar to that of the first example is obtained because of the effect of the inertia of the coolant that flows into the fuel assemblies 3.

Figure 15:
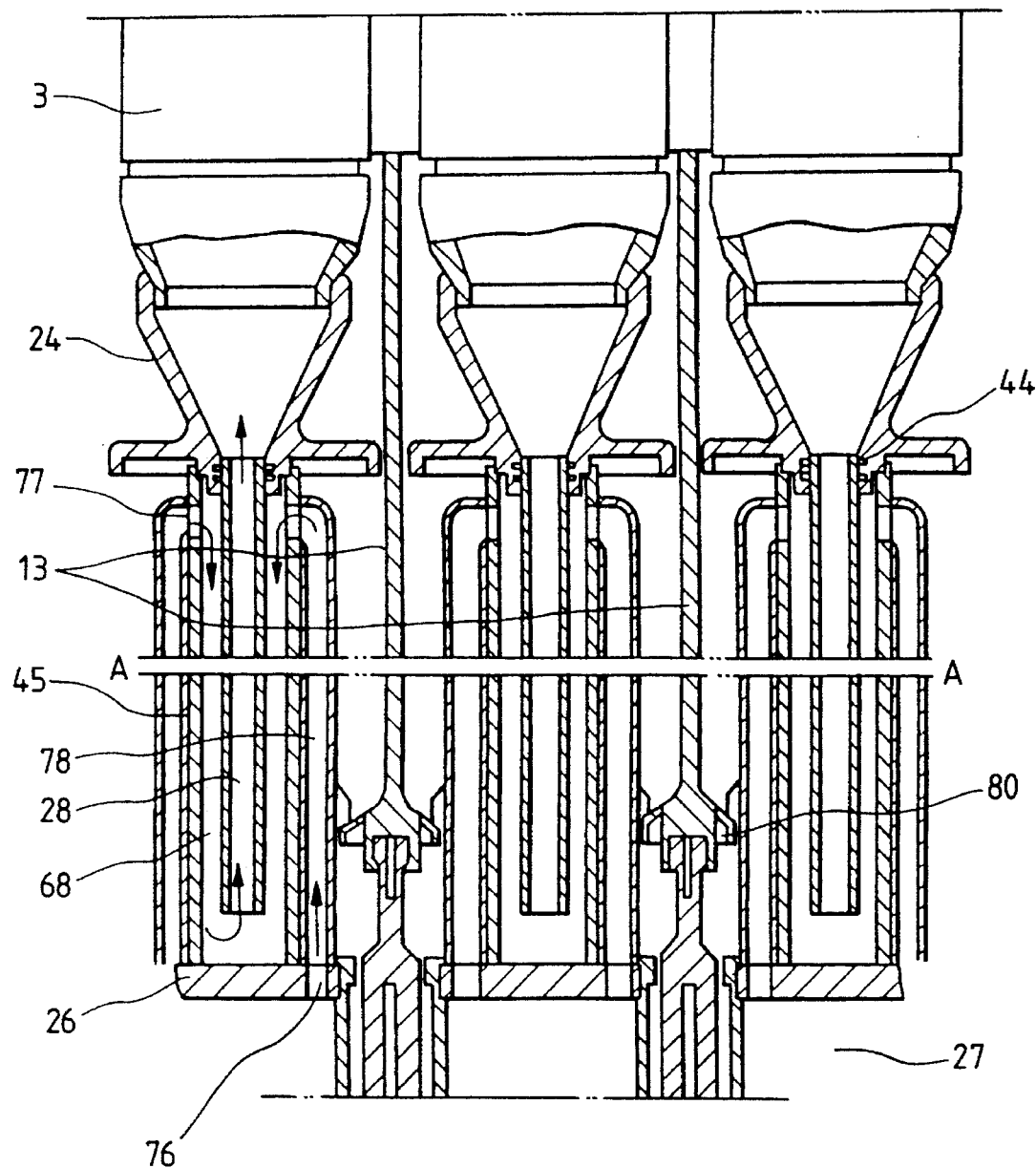
Figure 16:
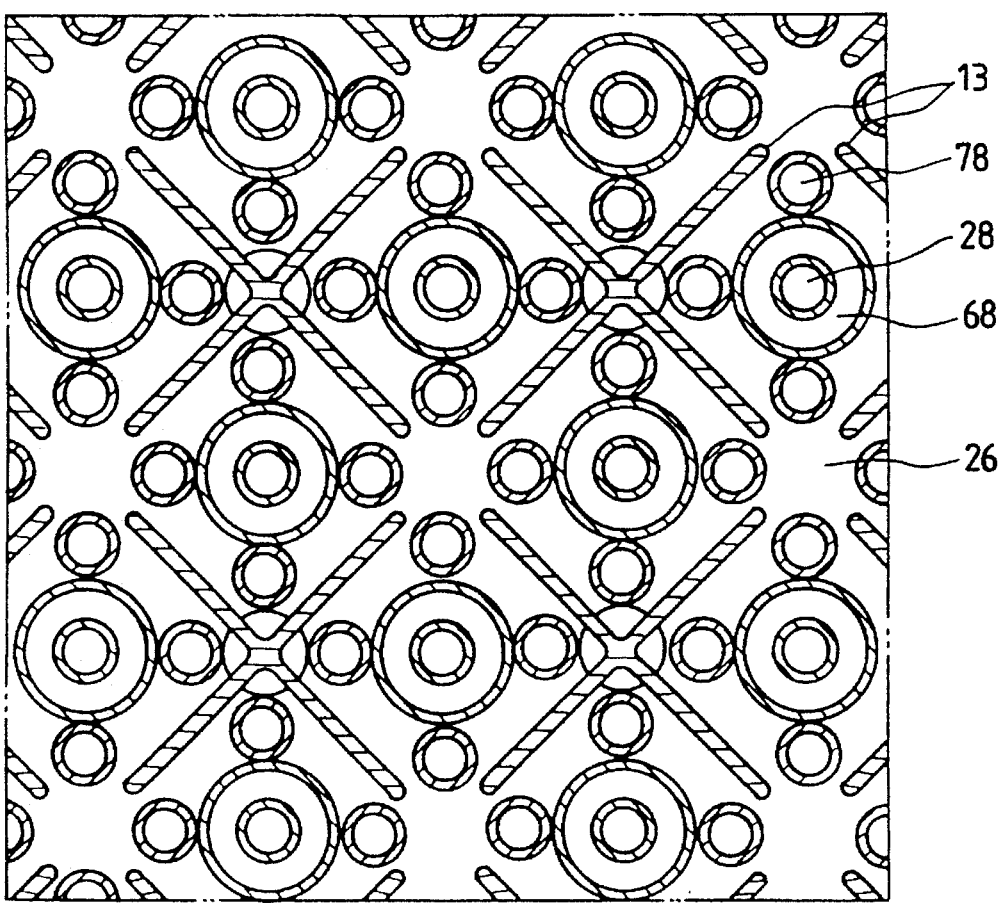

A seventh example of this invention is explained with reference to FIG. 15 and FIG. 16. FIG. 15 is a vertical sectional view of the lower structure of the core. FIG. 16 is a sectional view along the A—A line in FIG. 15.

In this example, in the lower part of the structure of the core, there is provided a coolant guide tube 78 which communicates with opening 76 and the opening region 77.

It is effective that the flow area of coolant guide tube 78, the flow area of coolant guide tube 68 and the flow area of coolant guide tube 28 are made substantially equal from the view point of avoiding pressure loss due to reduction and expansion of the flow area of the coolant.

In this example, a falling velocity limiter 80 is provided in the lower end of control rod 13. The cross section of the falling velocity limiter 80 is constructed with an expanding portion at its bottom. By this structure, coupling 15 detaches and control rod 13 remains at the time of withdrawing of control rod 13. Then, when control rod 13 falls by itself, a sudden increase of the core reactivity is prevented. Since the falling velocity limiter 80 functions as a flow resistance, the falling velocity of the control rod 13 can be limited.

In this example, the flow of the coolant near the control rod 13 outside the support tube 45 disappears almost completely by providing the coolant guide tube 78, so that the falling velocity limiter 80 can be installed easily. Because the length of the coolant guide tube increases to about 1.5 times in comparison with the sixth example, the flow stability of the two-phase flow in the fuel assembly can be improved.

According to this example, the operability and the economy of the nuclear reactor can be improved as mentioned before.

Figure 17:
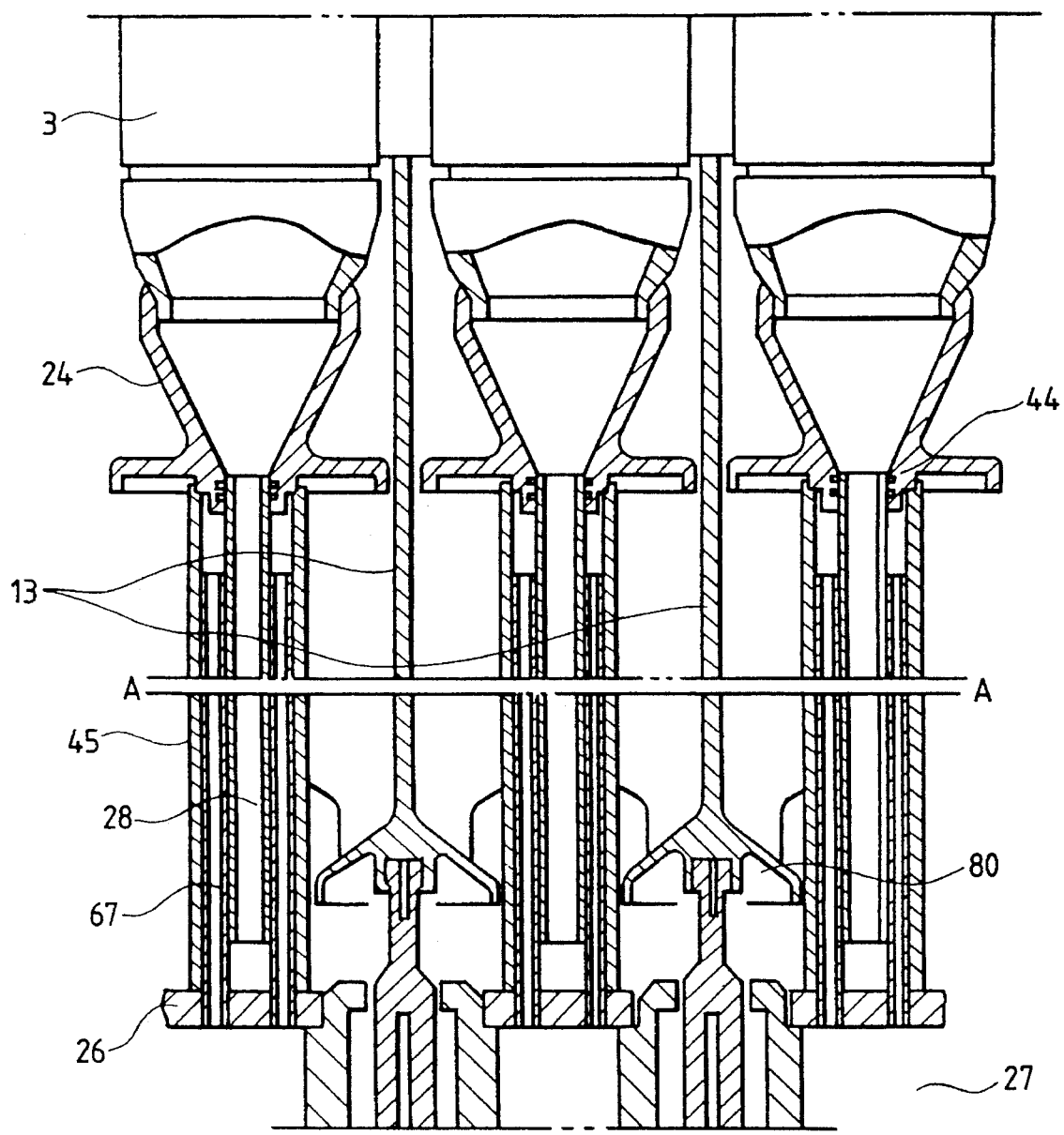
Figure 18:
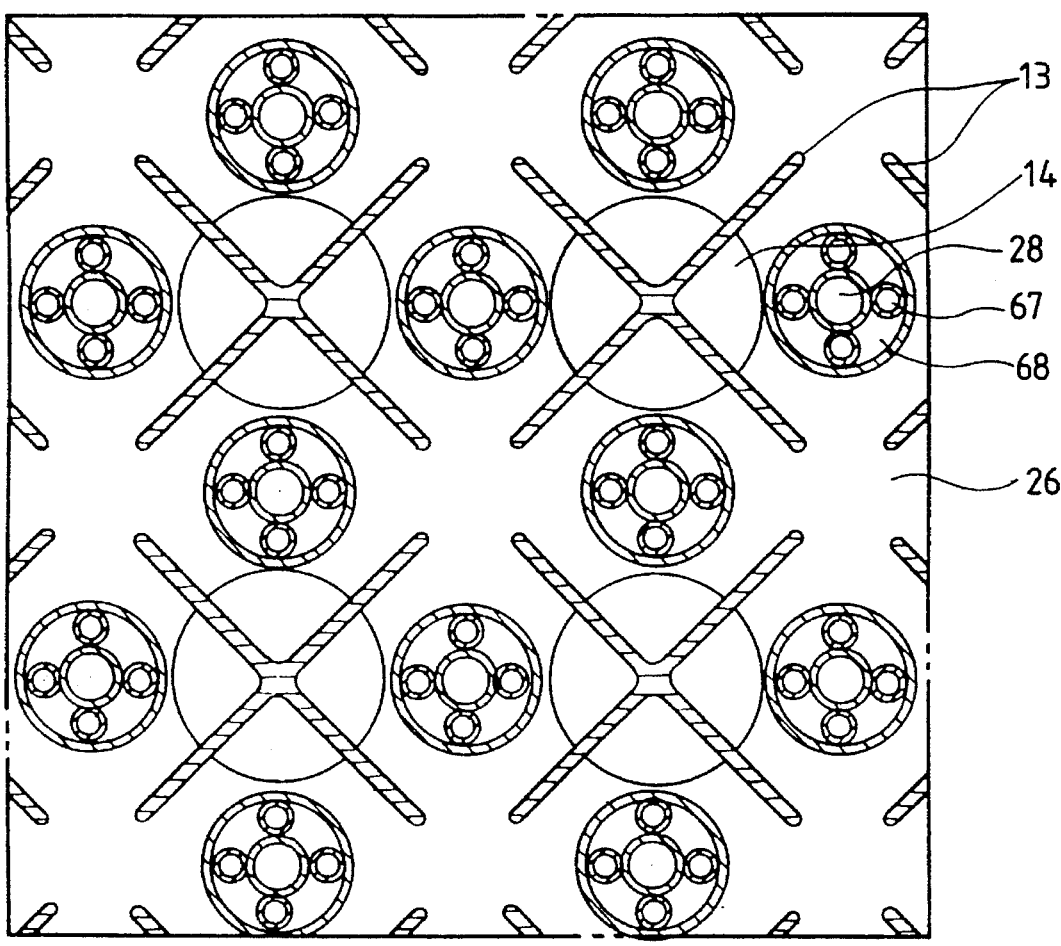
Figure 19:
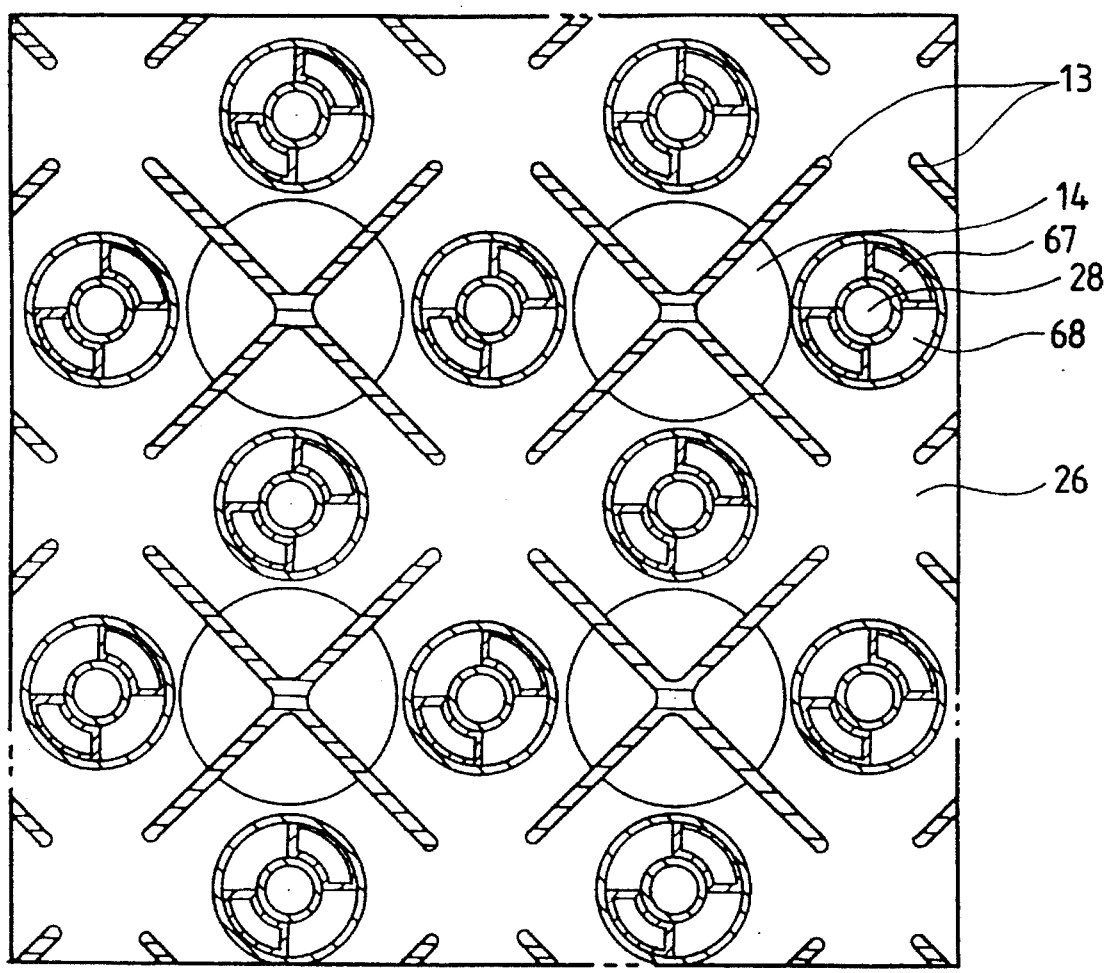

An eighth example of this invention is explained with reference to FIG. 17 to FIG. 19. FIG. 17 is a vertical sectional view of the lower part of the structure core of the according to this invention. FIG. 18 and FIG. 19 are sectional views taken along the A—A line in FIG. 17.

In this example, in the lower part of the structure of the core having a coolant guide tube 67 of the linear single pipe type, the coolant guide tube communicates with the bottom portion passage 27 of the pressure vessel and the coolant guide passage 68 in support tube 45. It is desirable that the flow area of coolant guide tube 67, the flow area of coolant guide passage 68 and the flow area of coolant guide tube 28 are approximately equal to each other with a view to preventing the occurrence of a pressure loss due to reduction and expansion of the flow area of the coolant passages.

The cross section of coolant guide tube 67 can be formed in a cylinder-form as shown in FIG. 18 or in a fan-form as shown in FIG. 19 for adjusting the flow area. In addition, there is provided a falling velocity limiter 80 in the lower end of control rod 13, whose cross section spreads towards the lower side.

In this example, because space can be formed around support tube 45 by providing coolant guide tube 67 in support tube 45, a large-sized falling velocity limiter 80 can be installed easily, thereby to improve the safety of the nuclear reactor in comparison with the seventh example. An effect about the improvement of the flow stability and the reduction of rated pressure loss of coolant that is similar to that of example 7 is expected by the coolant guide tube.

According to this example, since the effect of the inertia of the coolant flowing into fuel assembly 3 is accelerated, an improved operability and the economy of the nuclear reactor can be obtained as in the first example.

Figure 20:
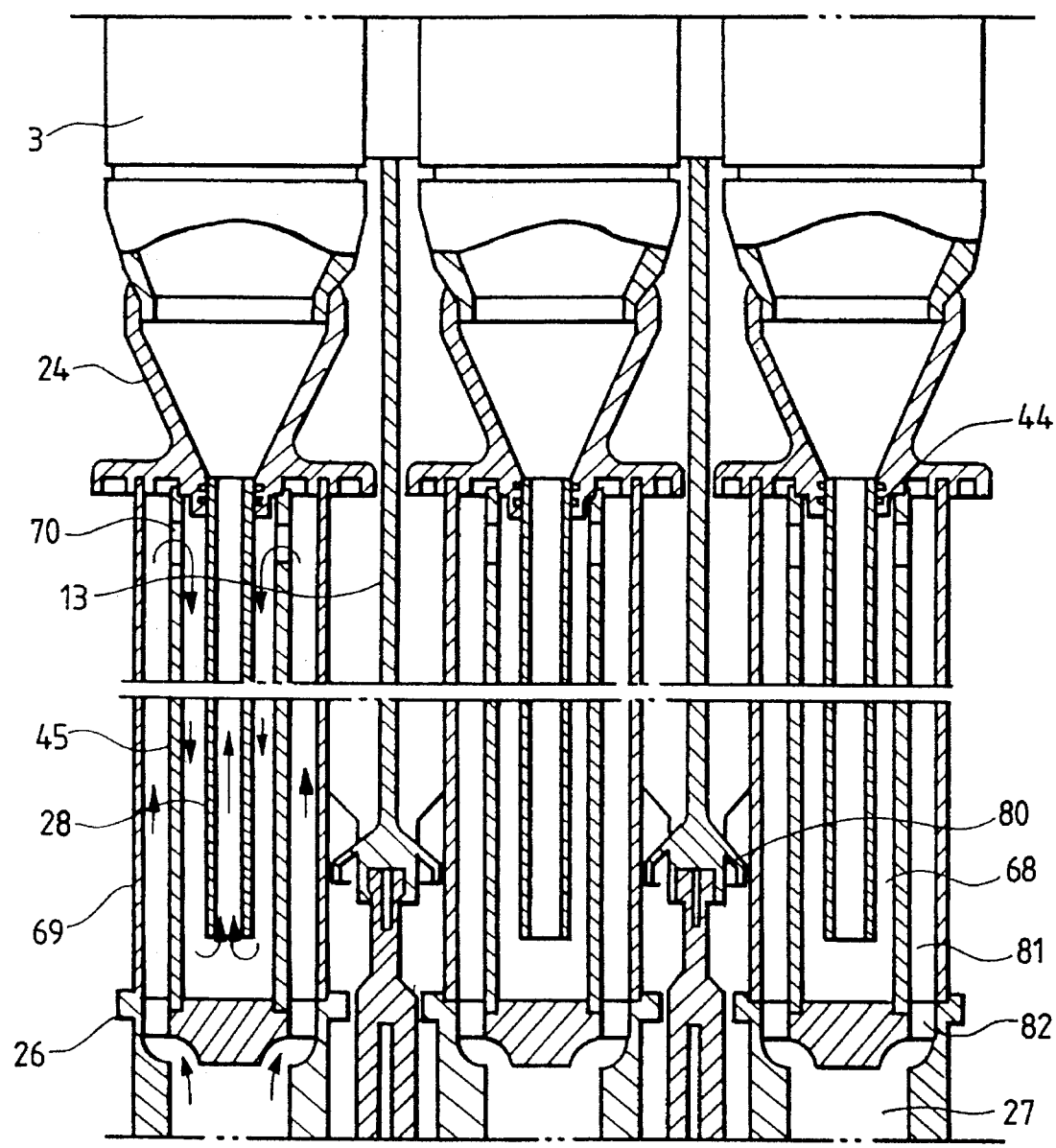
Figure 21:
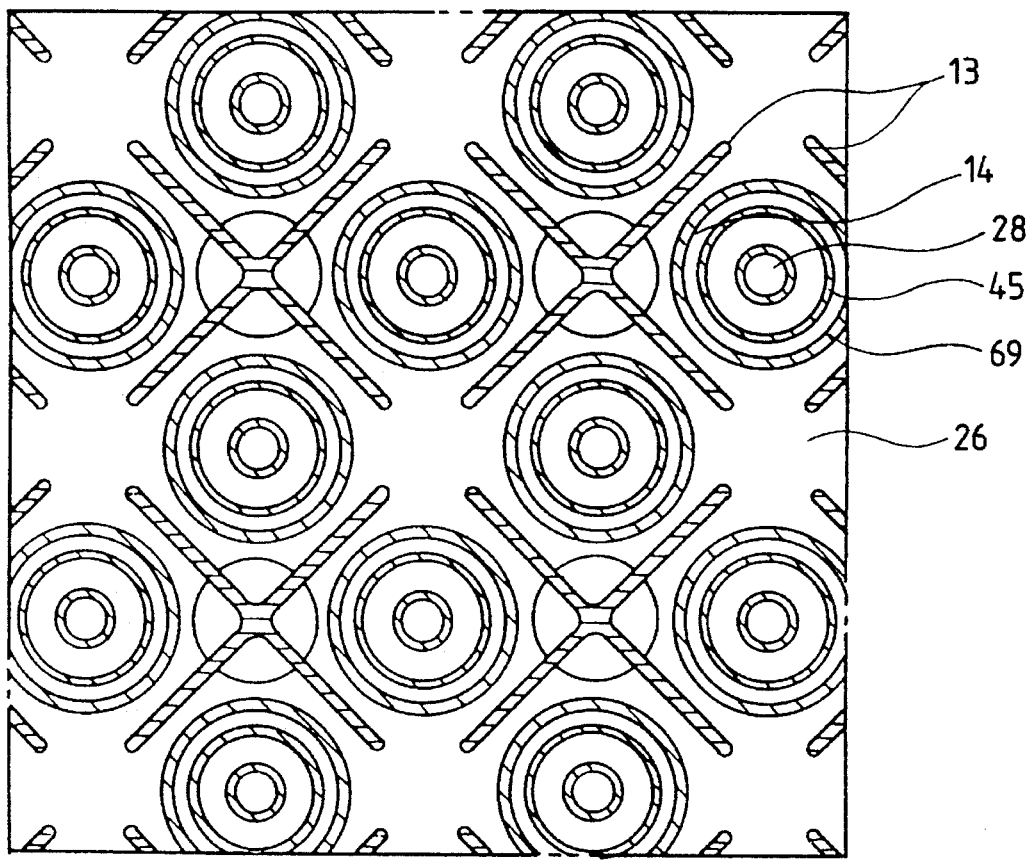

A ninth example of this invention is explained with reference to FIG. 20 and FIG. 21. FIG. 20 is a vertical sectional view of the lower part structure of the core. FIG. 21 is a sectional view along the A—A line of FIG. 20.

In the lower part structure of the core shown in the sixth example, annular coolant guide passage 81 is formed between support tube 69 and support tube 45. Support tube 69 is disposed outside support tube 45. Bottom portion passage 27 of the pressure vessel is in communication with to annular coolant guide passage 81 through opening 82. Preferably, the flow area of coolant guide passage 81, the flow area of coolant guide passage 68 and the flow area of coolant guide tube 28 are made approximately equal to each other, thereby to prevent the occurrence of a pressure loss with reduction and expansion of the flow area of the coolant.

In this example, since support tube 69 and support tube 45 support fuel support piece 24, the support strength of fuel support piece 24 can be increased to expand the flexibility of designing the core. It is also possible to obtain improved economy of the nuclear reactor. The length of the coolant guide passage is made approximately equal to that of the eighth example, and an effect similar to that of the eighth example is also obtained.

This example also improves the operability of the nuclear reactor and the economy by virtue of an action and effect similar to that of the first example because of the improved effect of the inertia of the coolant flowing into the fuel assembly 3.

Figure 22:
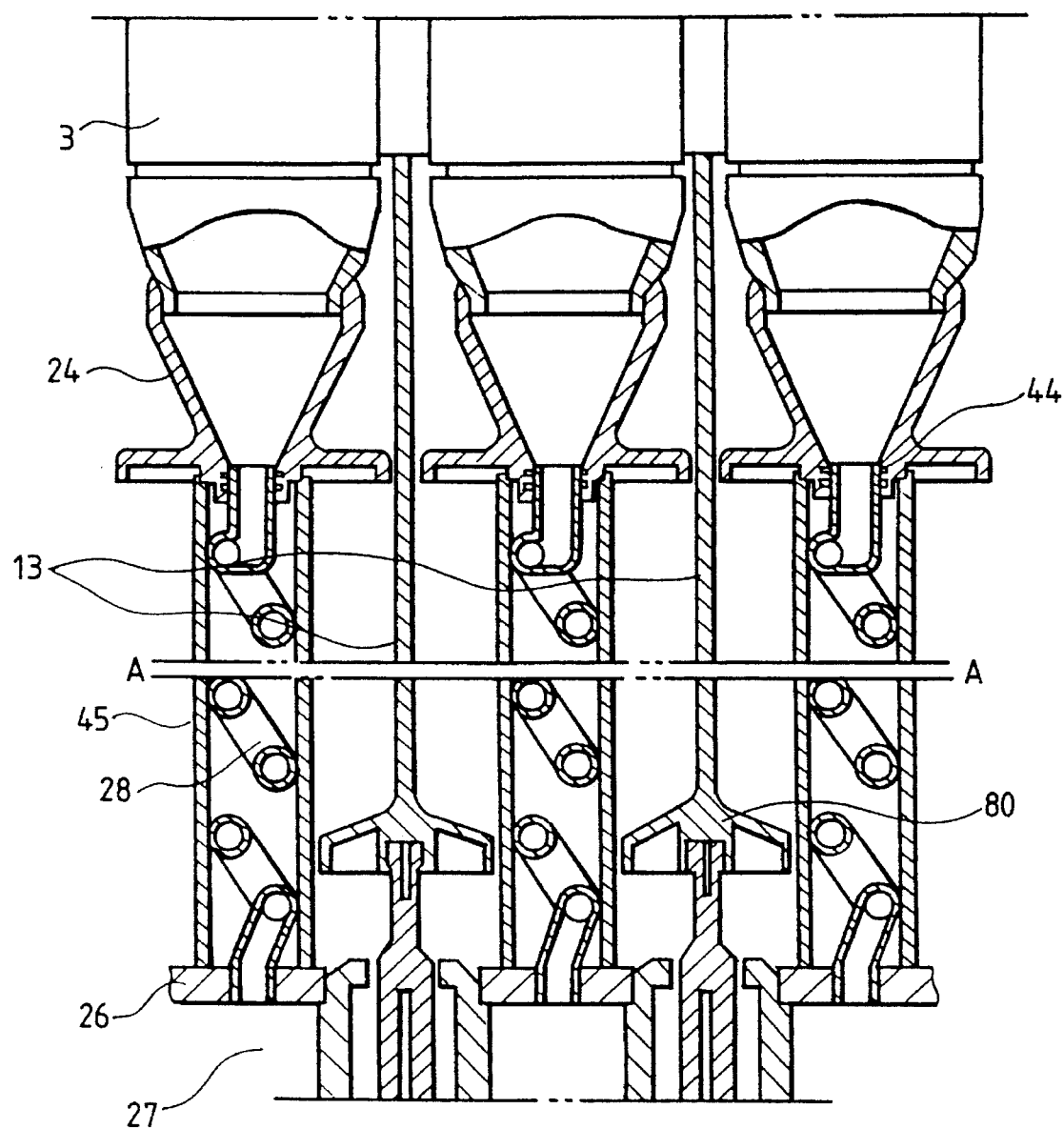
Figure 23:
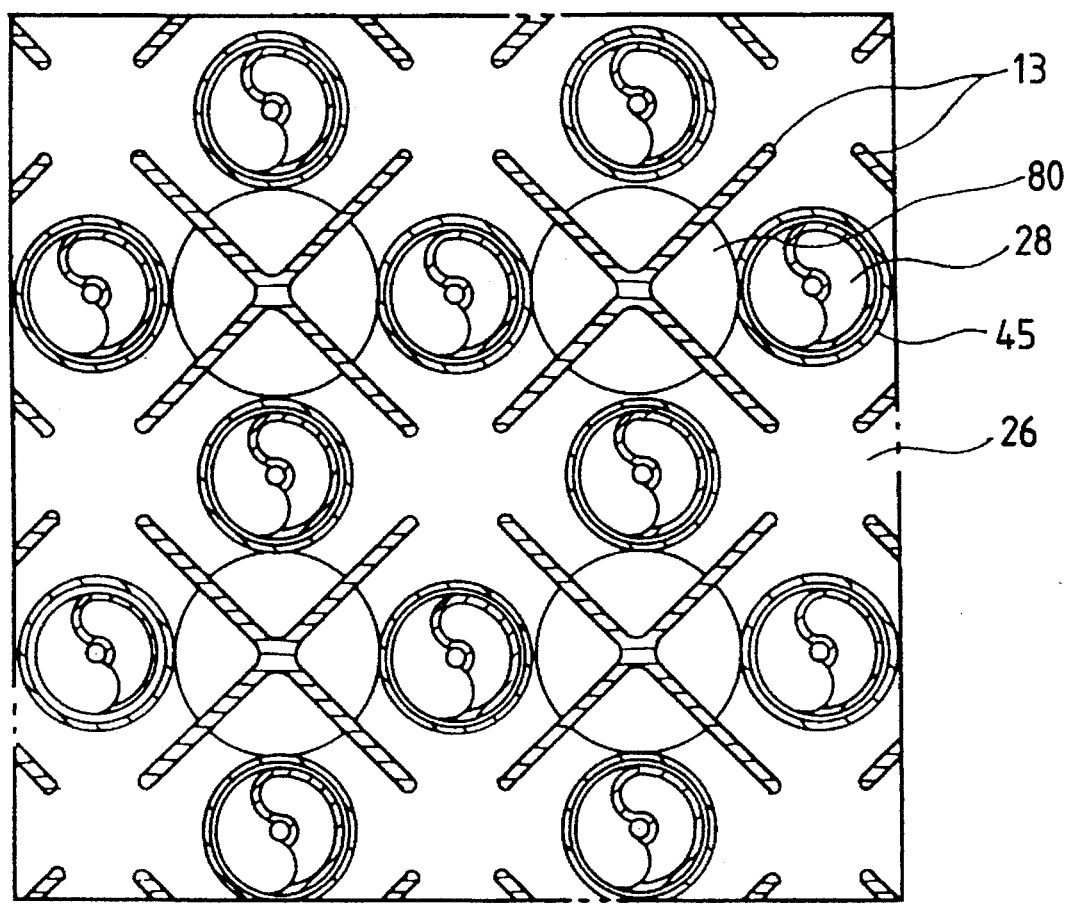

A tenth example of this invention is explained with reference to FIG. 22 and FIG. 23. FIG. 22 is a vertical sectional view of the lower part of the structure of the core. FIG. 23 is a sectional view along the A—A line of FIG. 22.

In this example, the coolant guide tube 28, having support tube 45, is formed in a spiral-form as a single pipe, coolant guide tube 28 communicates with the inside of fuel support piece 24 and bottom portion passage 27 of the pressure vessel.

The coolant guide tube 28 of spiral-form in this example is also applicable to the coolant guide tube of the sixth example shown in FIG. 13. In this case, the coolant guide tube can be further lengthened than in the sixth example by communicating with the coolant guide passage or the coolant guide tube that descends spirally from opening 77 with coolant guide tube 28 as a straight pipe at the center of the support tube 45. Similarly, it is possible to effect communication between the coolant guide passage that descends straight from opening 77 with the coolant guide tube of spiral-form at the lower part of support tube 45. According to this example, an improved operability and economy of the nuclear reactor can be obtained as mentioned before.

Figure 24:
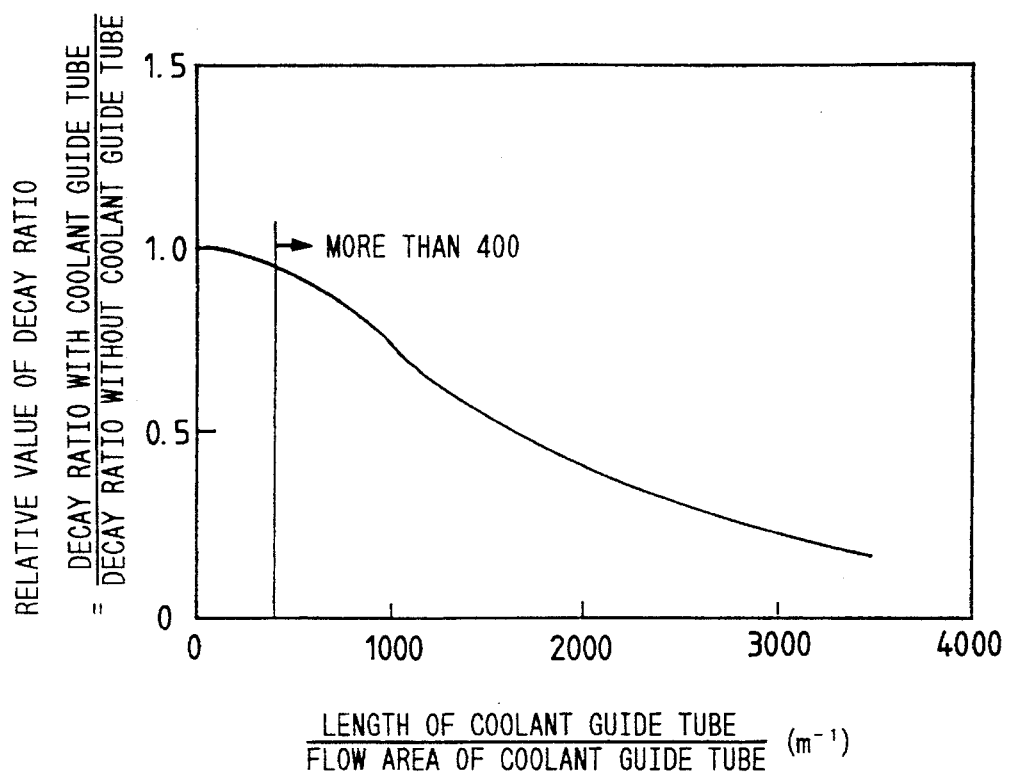
FIG. 24 is a characteristic graph of the coolant guide tube in accordance with embodiments of the present inventors.

The effect of the coolant guide tube is explained with reference to FIG. 24. FIG. 24 is a characteristic graph of the effect of the coolant guide tube that covers the first through tenth examples. The abscissa represents a value (L/A) in units of $m^{-1}$ obtained by dividing the length of the passage of the coolant guide tube in units of m by the flow area in units of $m^2$. The ordinate represents the relative value of the decay ratio that represents the flow stability of the two-phase flow in the vicinity of the fuel assemblies. The relative values are obtained by dividing the value (L/A) in case of having a coolant guide tube by the value (L/A) in case of not having the coolant guide tube. The decay ratio is the value that represents damping of the flow amplitudes; and, the smaller the value, the greater the flow stability is.

Therefore, the smaller the absolute value on the ordinate, the greater the effect of the coolant guide tube is expected to be, and the flow stability in the fuel assemblies becomes greater. The analytical results shown in FIG. 24 show that the effect of the coolant guide tube is not expected when the relative value of the decay ratio is approximately one until L/A is 200 $m^{-1}$, but the better effect on the flow stability by the coolant guide tube is expected in the range of higher L/A values.

Preferably, when the value of L/A is 400 $m^{-1}$ or more, the decay ratio decreases by 10% or more, compared with the case of not having the coolant guide tube.

The passage of coolant can be sufficiently lengthened, thereby the operability and the economy of the nuclear reactor can be improved, and the pressure loss between the lower plenum and entrances of the fuel assemblies can be reduced so that the flow stability of the two-phase flow in the fuel assembly is improved by the action of the flow inertia of the coolant.

What is claimed is;

1. A boiling water nuclear reactor in which coolant is supplied to fuel assemblies in a pressure vessel from a lower plenum below the fuel assemblies comprising:

means for improving flow stability of a two-phase flow of said coolant in said fuel assemblies of said boiling water nuclear reactor by providing an increased path length of said coolant flow, said flow stability means including a first passage connected to a coolant entrance of said lower plenum for effecting downward flow of said coolant, and a second passage communicating with said first passage for effecting upward flow of said coolant from the first passage, whereby said coolant is supplied to said fuel assemblies from said second passage and enabling flow stability of the two-phase flow of said coolant in said fuel assemblies.

2. The nuclear reactor as defined in claim 1, wherein the flow stability means includes having the flow area of said first passage be approximately equal to the flow area of said second passage.

3. The nuclear reactor as defined in claim 2, wherein the flow stability means include having a number obtained by dividing the combined passage length of said first passage and said second passage in units of m by the flow area of the passages in units of $m^2$ be 400 or more in units of $m^{-1}$.

4. The nuclear reactor as defined in claim 1, wherein at least one of said first passage and said second passage has a spiral-form.

5. The nuclear reactor as defined in claim 1, wherein said second passage is surrounded by said first passage.

6. The nuclear reactor as defined in claim 1, wherein the first passage is connected to a coolant entrance located on an upper part of a fuel support means for said fuel assemblies, and said second passage has a coolant entrance located on the lower part of the fuel support means for connection with the first passage, the second passage having an exit located at a top of the fuel support means for supplying the coolant to said fuel assemblies.

7. A boiling water nuclear reactor in which coolant is supplied to fuel assemblies in a pressure vessel from a lower plenum below the fuel assembly comprising:

means for improving flow stability of a two-phase flow of said coolant in said fuel assemblies of said boiling water nuclear reactor by providing an increased path length of said coolant flow, said flow stability means including a first passage connected to a coolant entrance of said lower plenum for effecting upward flow of said coolant, a second passage connected to said first passage for effecting downward flow of said coolant from said first passage and a third passage for effecting upward flow of the coolant from said second passage, whereby the coolant is supplied to said fuel assemblies and enabling flow stability of the two-phase flow of said coolant in said fuel assemblies.

8. The nuclear reactor as defined in claim 7, wherein the flow stability means include having the flow area of said first passage, the flow area of said second passage and the flow area of said third passage be approximately equal.

9. The nuclear reactor as defined in claim 7, wherein said third passage is surrounded by said first passage and said second passage.

10. The nuclear reactor as defined in claim 7, wherein said first passage has a coolant entrance located on a bottom of a fuel support means for said fuel assemblies, said second passage being connected with said first passage and having a coolant entrance located on an upper part of the fuel support means, and said third passage being connected with said second passage and having a coolant entrance located on a lower part of the fuel support means and an exit located on a top of the fuel support means, said coolant being supplied to said fuel assemblies from the exit of said third passage.

11. A boiling water nuclear reactor in which coolant is supplied to fuel assemblies in a pressure vessel from a lower plenum below the fuel assemblies comprising:

means for improving flow stability of a two-phase flow of said coolant in said fuel assemblies of said boiling water nuclear reactor by providing an increased path length of said coolant flow, said flow stability means including a coolant passage of a spiral-form communicating with a coolant entrance of said lower plenum for mixing the coolant, before the coolant is supplied to said fuel assemblies from said coolant passage and enabling flow stability of the two-phase flow of said coolant in said fuel assemblies.

12. The boiling water reactor as defined in claim 9, wherein said coolant passage of spiral-form has a coolant entrance located on a bottom of a fuel support means for said fuel assemblies and a coolant exit located on a top of the fuel support means, said coolant passage being a single pipe having the spiral-form and said coolant being supplied to said fuel assemblies from the exit.

13. The nuclear reactor as defined in claim 9, wherein said coolant passage includes a first passage of spiral-form having a coolant entrance located on an upper part of a fuel support means for said fuel assemblies and an exit located on a lower part of the fuel support means for effecting downward flow of said coolant.

14. The nuclear reactor as defined in claim 13, further comprising a second passage having a coolant entrance located on the lower part of the fuel support means for communicating with said first passage effecting downward flow and an exit located on the upper part of the fuel support means, said second passage effecting upward flow of said coolant, whereby said coolant is supplied to said fuel assemblies from said second passage.

* * * * *